(12) United States Patent
Sato

(10) Patent No.: US 8,547,644 B2
(45) Date of Patent: Oct. 1, 2013

(54) ZOOM LENS AND IMAGE PICKUP APPARATUS WITH ZOOM LENS

(75) Inventor: Arata Sato, Utsunomiya (JP)

(73) Assignee: Canon Kabushiki Kaisha, Toyko (JP)

( * ) Notice: Subject to any disclaimer, the term of this patent is extended or adjusted under 35 U.S.C. 154(b) by 73 days.

(21) Appl. No.: 13/186,828

(22) Filed: Jul. 20, 2011

(65) Prior Publication Data

US 2012/0019928 A1    Jan. 26, 2012

(30) Foreign Application Priority Data

Jul. 24, 2010    (JP) .................................. 2010-166579

(51) Int. Cl.
*G02B 15/14*    (2006.01)

(52) U.S. Cl.
USPC .......................... 359/680; 359/686; 359/689

(58) Field of Classification Search
USPC .................... 359/680–682, 686, 689
See application file for complete search history.

(56) References Cited

U.S. PATENT DOCUMENTS

| | | | |
|---|---|---|---|
| 5,078,481 A | | 1/1992 | Nakayama et al. |
| 5,963,377 A | * | 10/1999 | Okada et al. ................... 359/686 |
| 7,379,250 B2 | * | 5/2008 | Souma .......................... 359/686 |
| 7,855,841 B2 | * | 12/2010 | Kubota ......................... 359/686 |
| 2008/0231968 A1 | * | 9/2008 | Souma .......................... 359/686 |
| 2010/0226018 A1 | * | 9/2010 | Hosokawa ..................... 359/682 |

* cited by examiner

*Primary Examiner* — Jordan Schwartz

(74) *Attorney, Agent, or Firm* — Canon U.S.A., Inc. IP Division

(57) ABSTRACT

A zoom lens includes a first lens unit having a negative refractive power and which is provided at a location closest to an object side, a lens unit LP having a positive refractive power, which is provided at a location closest to an image side, and which is stationary during zooming, and a lens unit LN having a negative refractive power, which is provided adjacent to the lens unit LP on the object side of the lens unit LP, and which is configured to move during zooming. In the zoom lens, optical parameters fp, fn, fw, ft, fni and vdni are appropriately set.

11 Claims, 16 Drawing Sheets

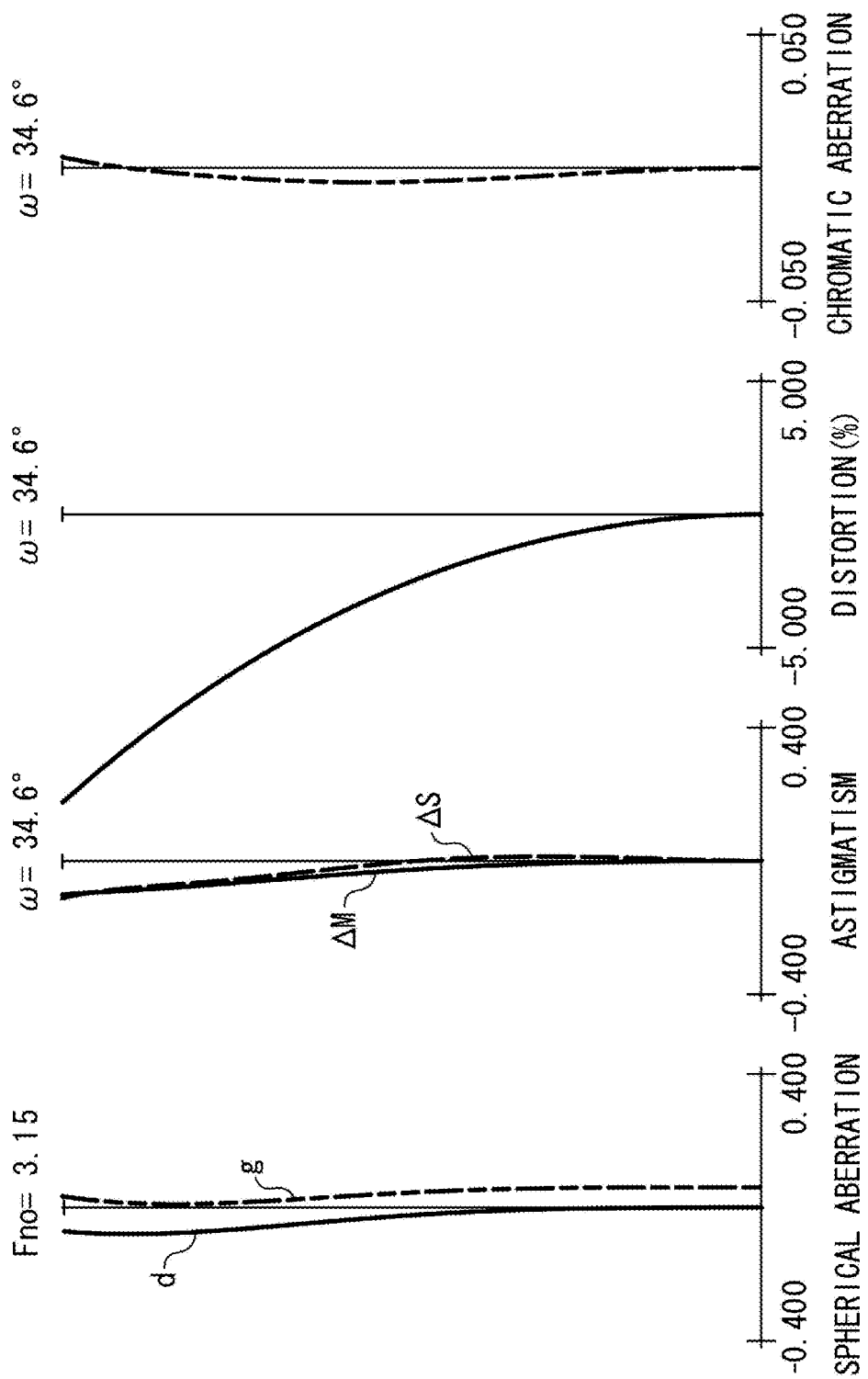

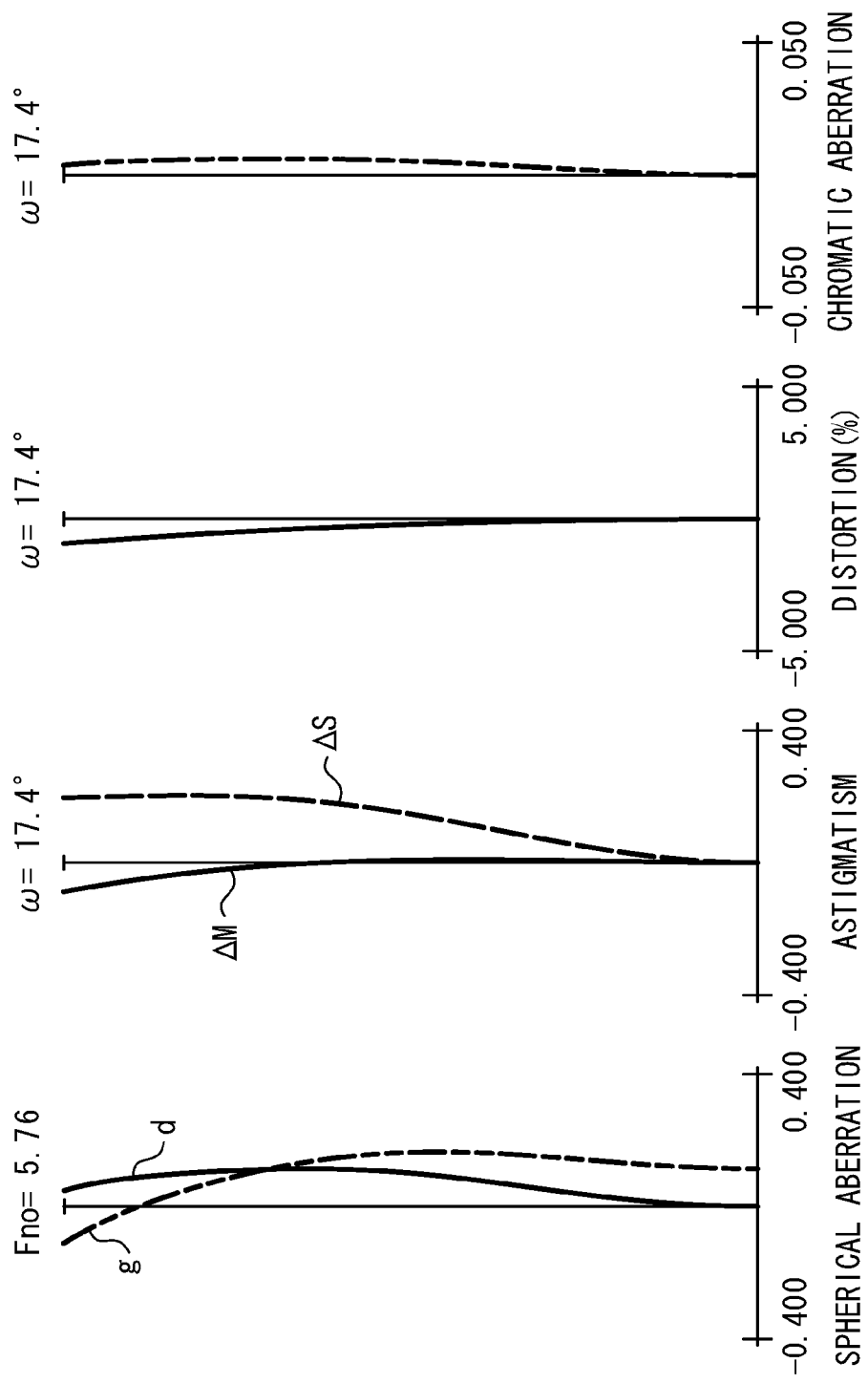

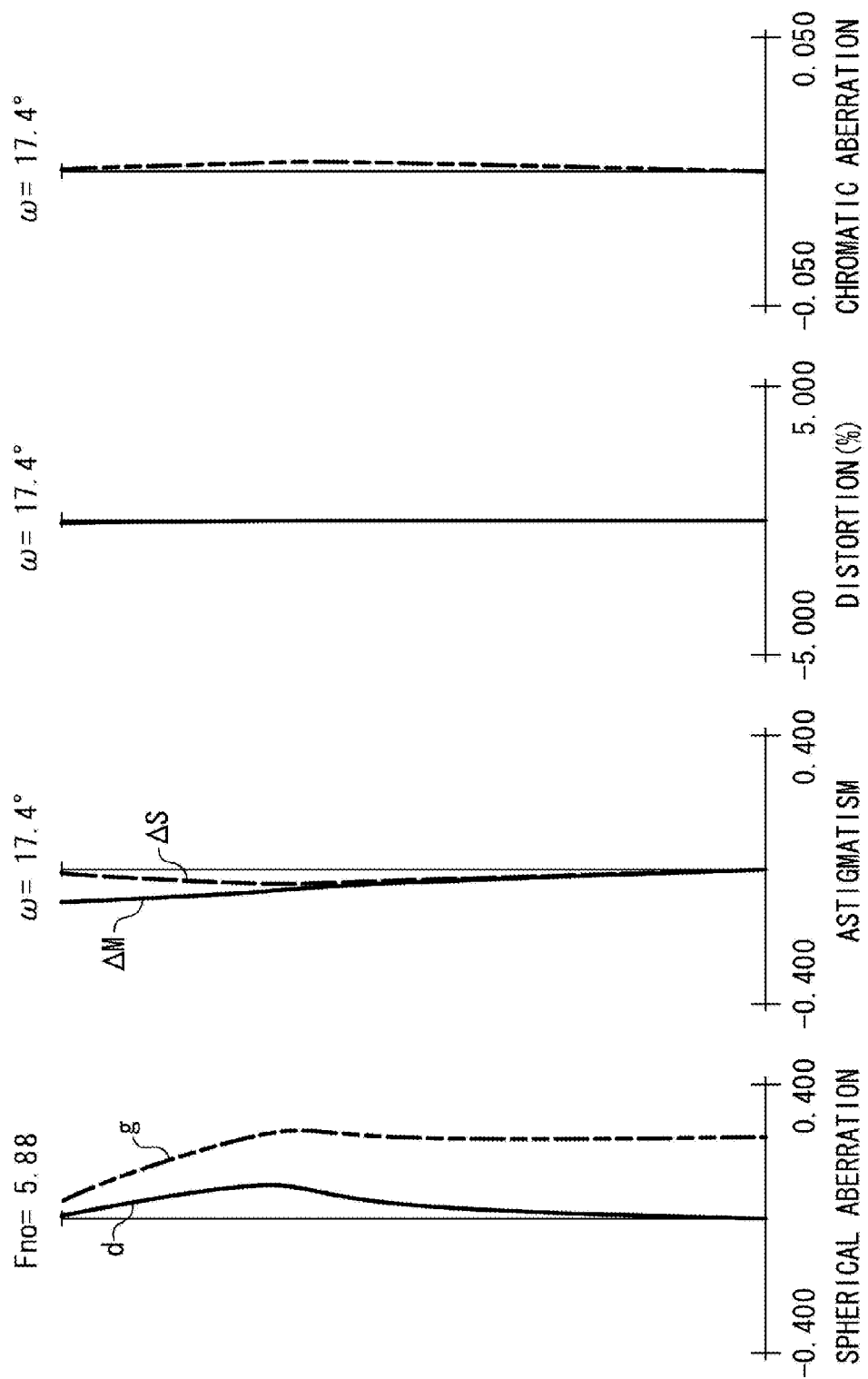

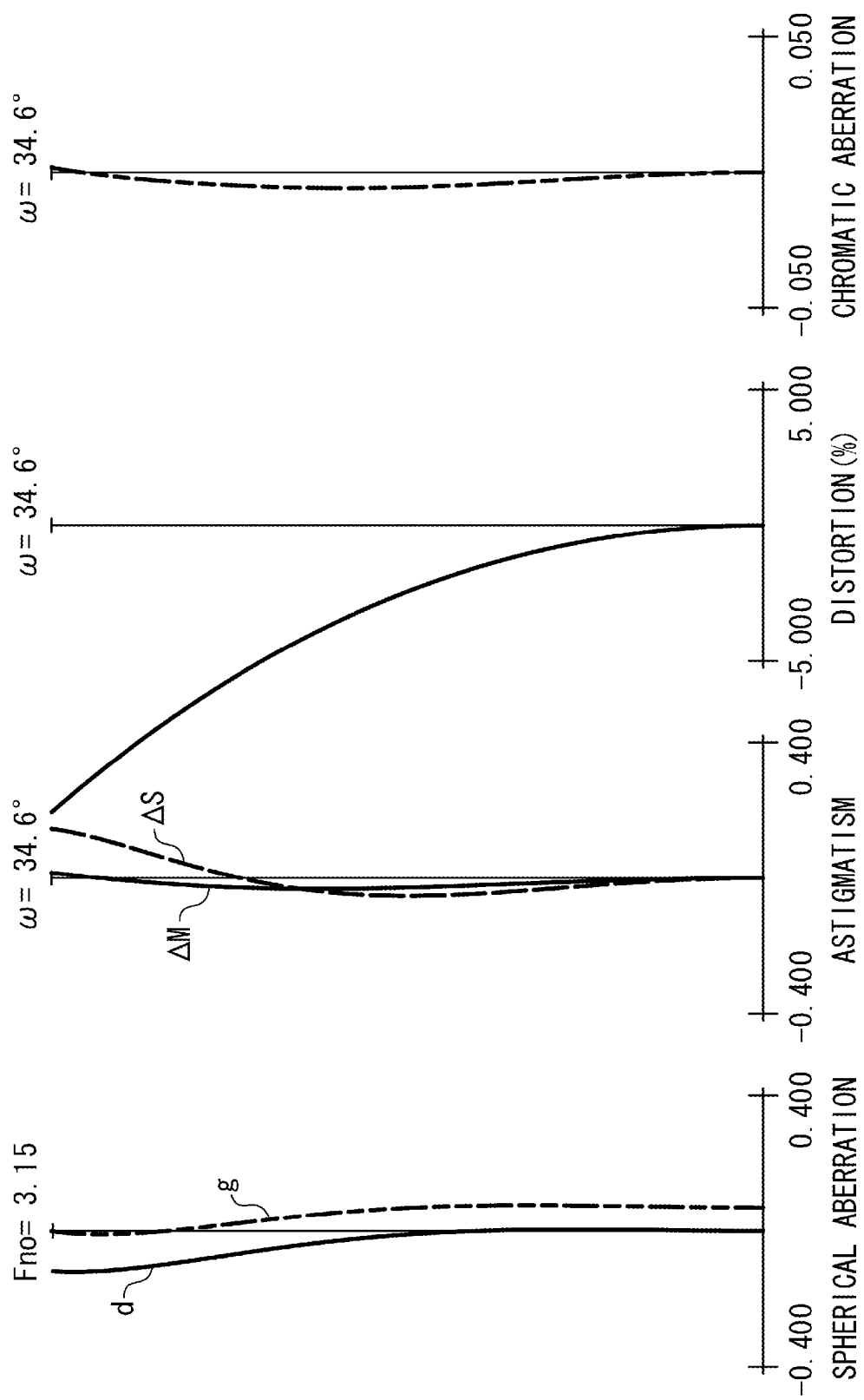

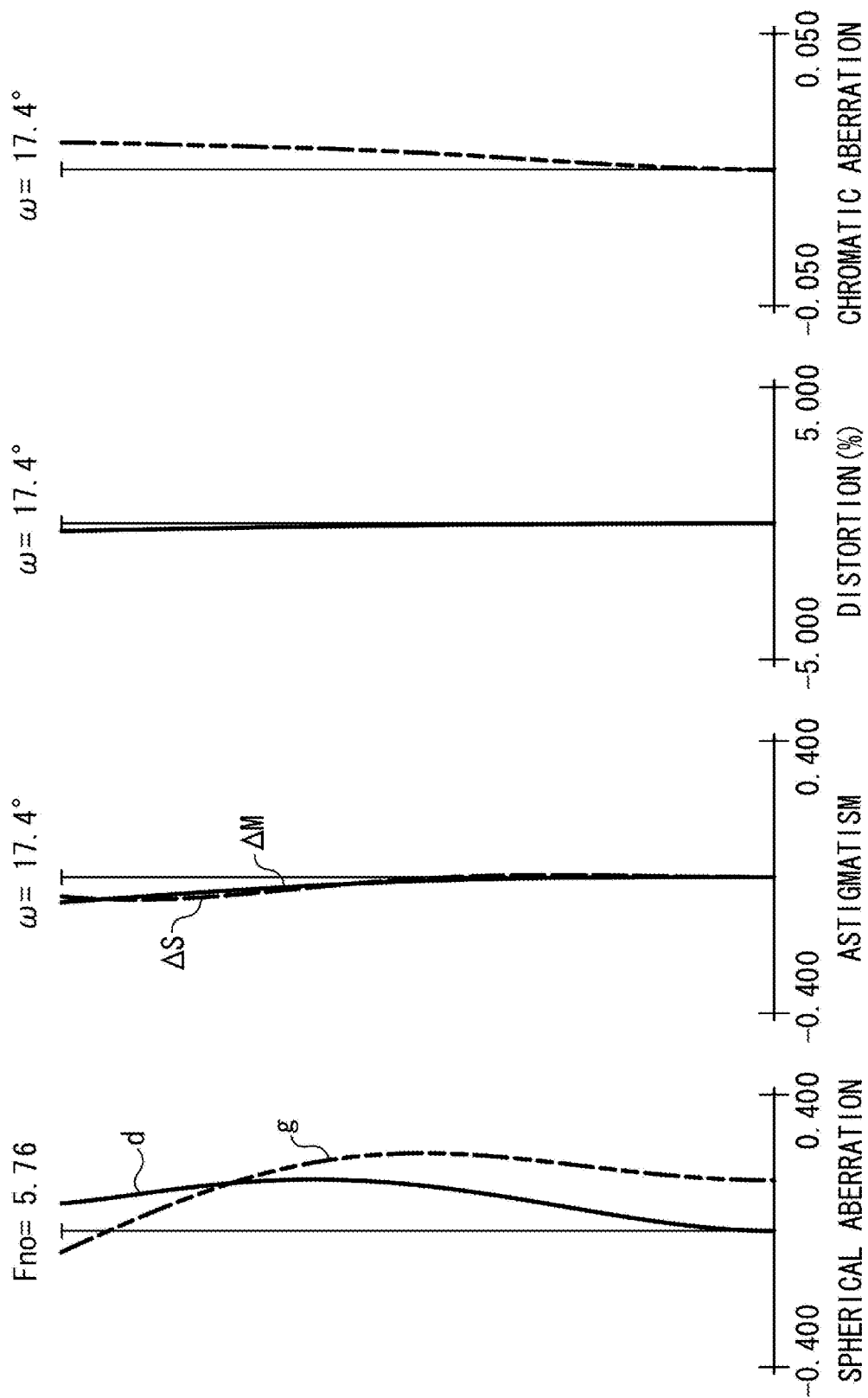

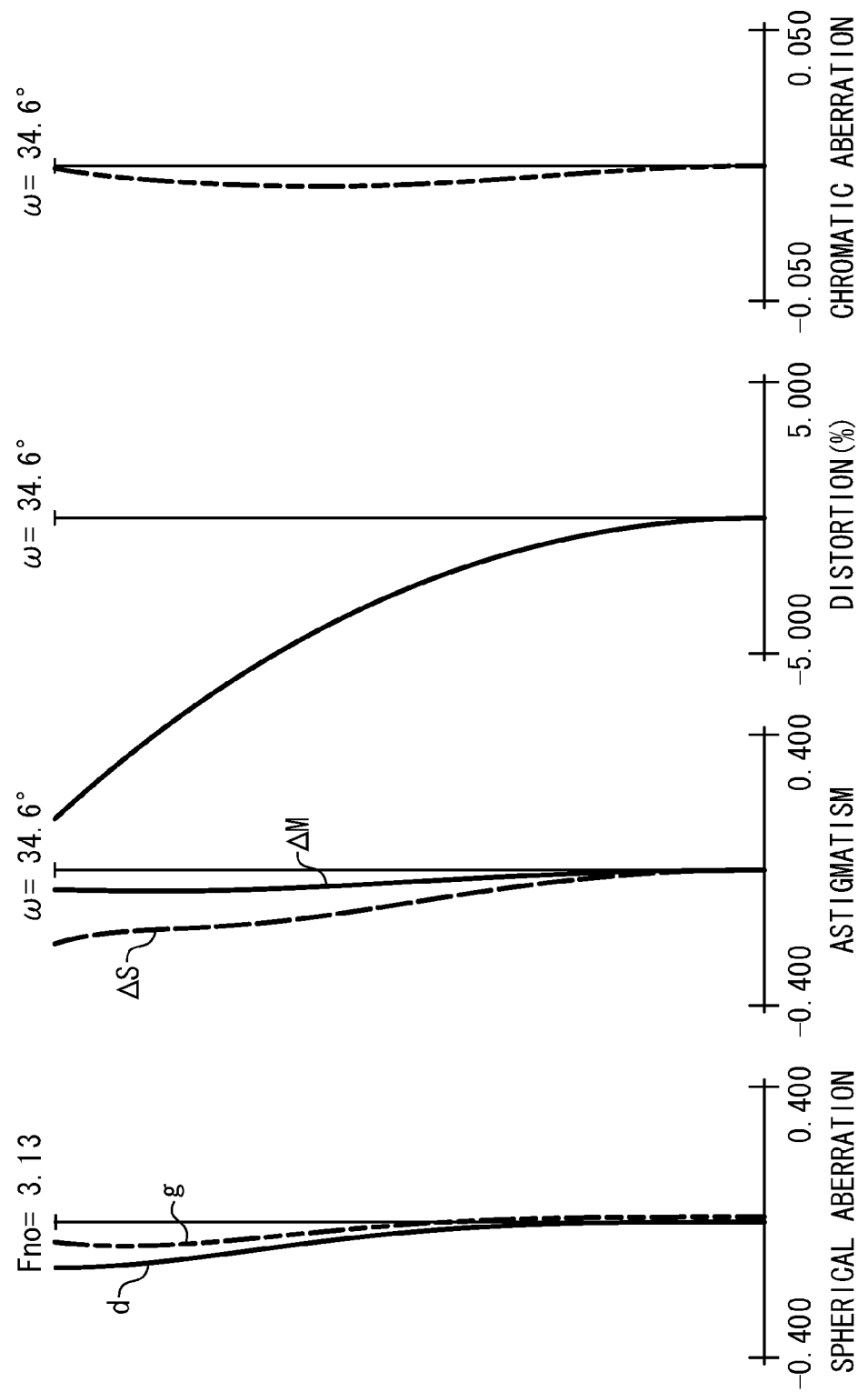

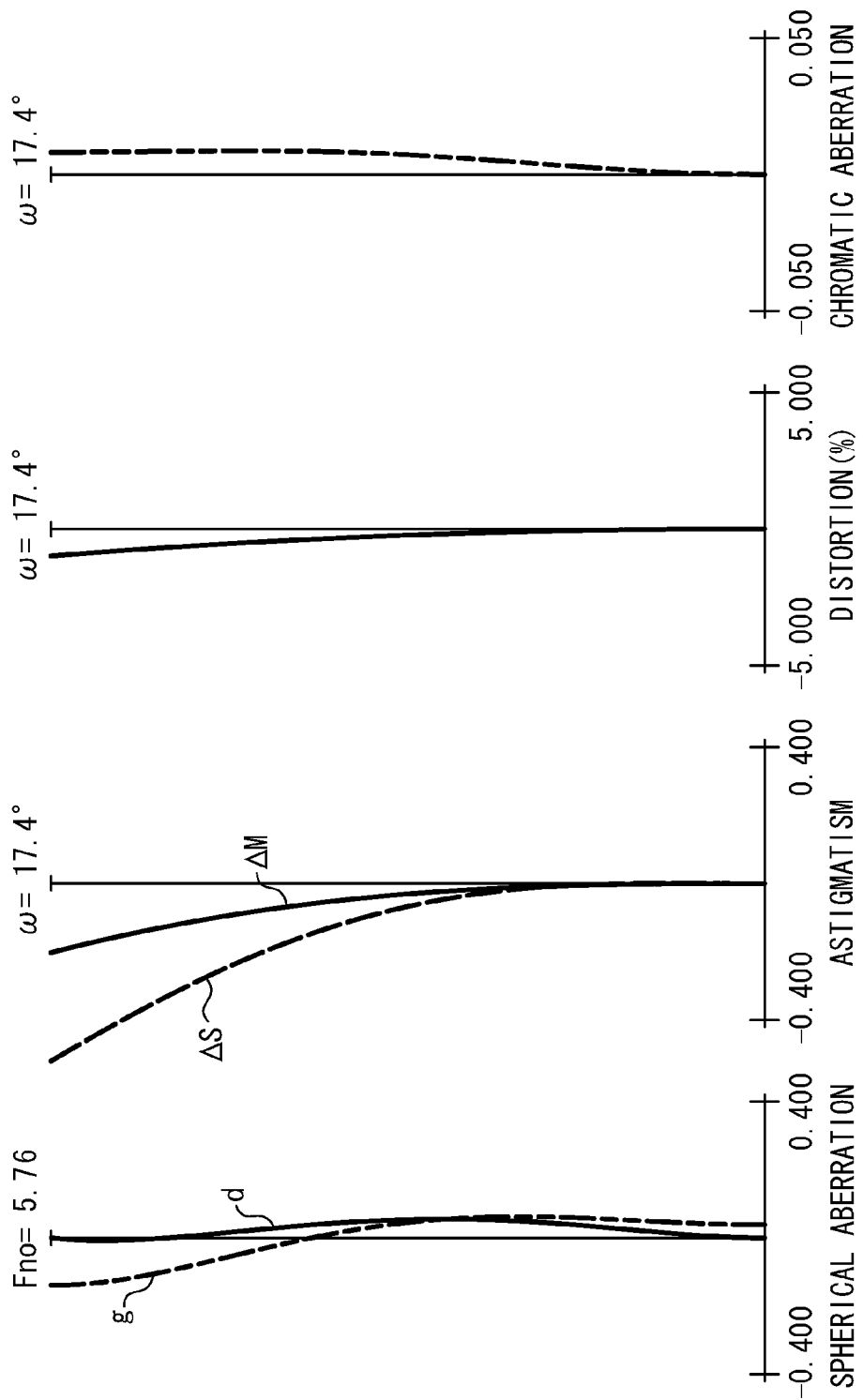

ZOOM LENS AND IMAGE PICKUP APPARATUS WITH ZOOM LENS

BACKGROUND OF THE INVENTION

1. Field of the Invention

The present invention relates to a zoom lens and an image pickup apparatus equipped with the zoom lens. In particular, the present invention relates to a zoom lens useful for an image pickup apparatus, such as a digital camera, a video camera, a television (TV) camera, a monitoring camera, or a silver-halide film camera.

2. Description of the Related Art

Advances in semiconductor technology and new manufacturing techniques have enabled the market proliferation of highly efficient and compact image pickup apparatuses. It is desired by the market that a photographic optical system used for an image pickup apparatus have a wide angle of view, a high optical performance for the entire zoom range, and be small-sized. With current optical design and manufacturing techniques, it is relatively easy to increase the angle of view of a negative lead type zoom lens, in which a lens unit having a negative refractive power is provided at a location closest to the object plane. Indeed, in recent years, compact negative lead type zoom lens units have been widely used.

As a negative lead type zoom lens, a zoom lens which includes a lens unit having a positive refractive power that is fixed at a location closest to the image side during zooming and a lens unit having a negative refractive power, which is provided adjacent to the positive lens unit on the object side thereof and which moves during zooming, has been used.

U.S. Pat. No. 5,963,377 and U.S. Pat. No. 5,078,481 discuss a zoom lens including, in order from the object side to the image side, a first lens unit having a negative refractive power, a second lens unit having a positive refractive power, a third lens unit having a negative refractive power, and a fourth lens unit having a positive refractive power. In the zoom lens disclosed in the above-referenced patents, the first through the third lens units move during zooming.

An image sensor used in a digital camera has a low tolerance for changes in the angle of incidence of a light flux that is incident on the image sensor. Accordingly, it is desirable that the image sensor be telecentric on the image side. However, in the negative lead type zoom lens, in order to reduce the size of the entire zoom lens while achieving a wide angle of view and a low angle of incidence of light that is incident on the image sensor, the amount of various aberrations, particularly, chromatic aberration of magnification (lateral chromatic aberration), may increase.

In order to achieve a zoom lens whose total size is small, having a low angle of incidence of a light flux that is incident on the image sensor, having a short focal length at the wide-angle end, and in which only a small amount of chromatic aberration of magnification may occur, it is significant to appropriately set the refractive power assigned to each lens unit and to selectively pick a material of a lens constituting each lens unit. In particular, it becomes significantly important to appropriately set the refractive power and the lens material of lenses included in a lens unit having a positive refractive power and provided at a location closest to the image side and a lens unit having a negative refractive power that is provided adjacent to the positive lens unit on the object side thereof.

SUMMARY OF THE INVENTION

The present invention is directed to a negative lead type zoom lens capable of achieving a wide angle of view and a high optical performance for the entire zoom range by appropriately setting a refractive power and a material of lenses included in each lens unit, and to an image pickup apparatus having the zoom lens.

According to an aspect of the present invention, a zoom lens includes: a first lens unit having a negative refractive power and which is provided at a location closest to an object side; a lens unit LP having a positive refractive power, which is provided at a location closest to an image side, and which is stationary during zooming; and a lens unit LN having a negative refractive power, which is provided adjacent to the lens unit LP on the object side of the lens unit LP, and which is configured to move during zooming. In the zoom lens, when fp and fn respectively denote focal lengths of the lens unit LP and the lens unit LN, fw and ft respectively denote focal lengths at a wide-angle end and at a telephoto end of the entire zoom lens, and fni and vdni are a focal length and an Abbe number of a material of an i-th lens among lenses that constitute the lens unit LN, the following conditions are satisfied:

$$0.66 < |fn/\sqrt{(fw \cdot ft)}| < 0.78$$

$$1.6 < |fp/fn| < 5.3$$

$$|\Sigma((1/(vdni) \times (\sqrt{(fw \cdot ft)}/fni))| < 0.023,$$

where i is a positive integer equal to or greater than 1 counted from the object side towards the image side.

Further features and aspects of the present invention will become apparent to persons having ordinary skill in the art from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIGS. 2A and 2B are aberration charts for the zoom lens according to the first exemplary embodiment at the wide-angle end and at the telephoto end, respectively.

FIGS. 4A and 4B are aberration charts for the zoom lens according to the second exemplary embodiment at the wide-angle end and at the telephoto end, respectively.

FIGS. 6A and 6B are aberration charts for the zoom lens according to the third exemplary embodiment at the wide-angle end and at the telephoto end, respectively.

FIGS. 8A and 8B are aberration charts for the zoom lens according to the fourth exemplary embodiment at the wide-angle end and at the telephoto end, respectively.

DESCRIPTION OF THE EMBODIMENTS

Various exemplary embodiments, features, and aspects of the invention will be described in detail below with reference to the drawings. As used herein, the side of a lens where an object to be imaged is located is referred to as the object side or front side of the lens; and the side of the lens where the image of the object is formed is referred to as the image side or back side of the lens. Incidentally, the place where the object to be imaged is located is referred to as the object plane; and the place where the image of the object is formed is referred to as the image plane.

A zoom lens according to an exemplary embodiment of the present invention includes a first lens unit having a negative refractive power and which is provided at a location closest to the object side, a lens unit LP having a positive refractive power, which is provided at a location closest to the image side and which is stationary during zooming, and a lens unit LN having a negative refractive power, which is provided adjacent to the lens unit LP on the object side of the lens unit LP and configured to move during zooming.

Figure 1:
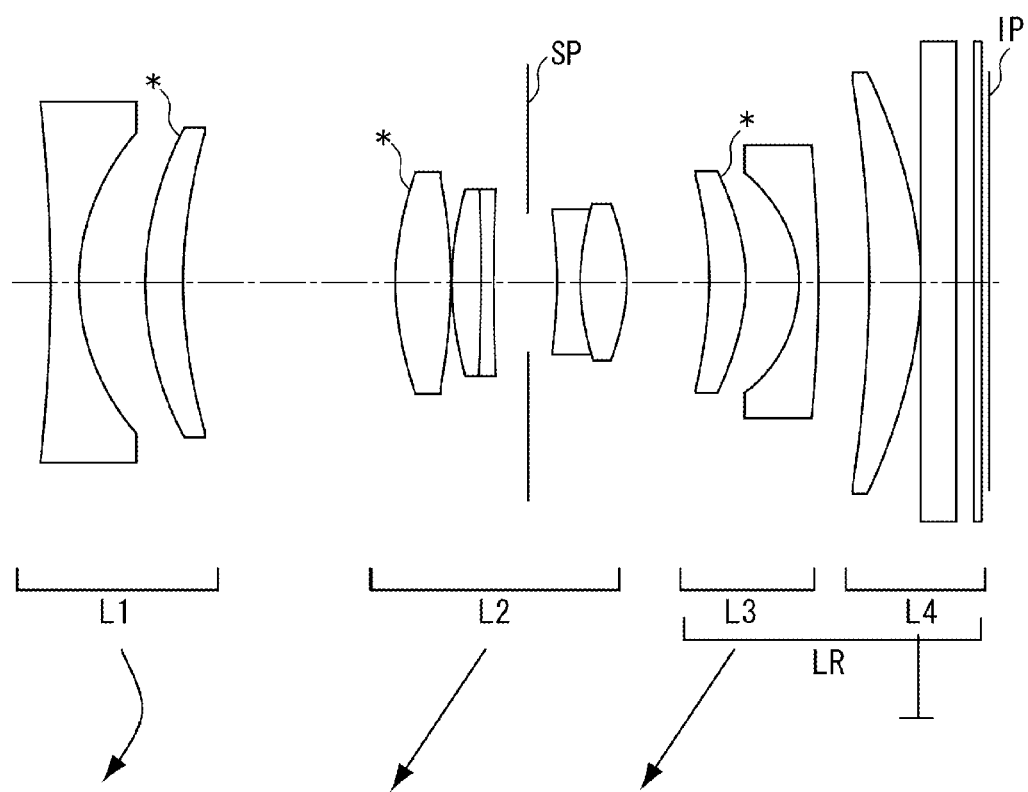
FIG. 1 is a cross sectional view of a zoom lens at the wide-angle end, according to a first exemplary embodiment of the present invention.

FIG. 1 is a cross sectional view of a zoom lens at the wide-angle end (short focal length end) according to a first exemplary embodiment of the present invention. FIGS. 2A and 2B are aberration charts of the zoom lens according to the first exemplary embodiment at the wide-angle end and at the telephoto end (long focal length end), respectively, when focusing on an infinitely-distant object.

Figure 3:
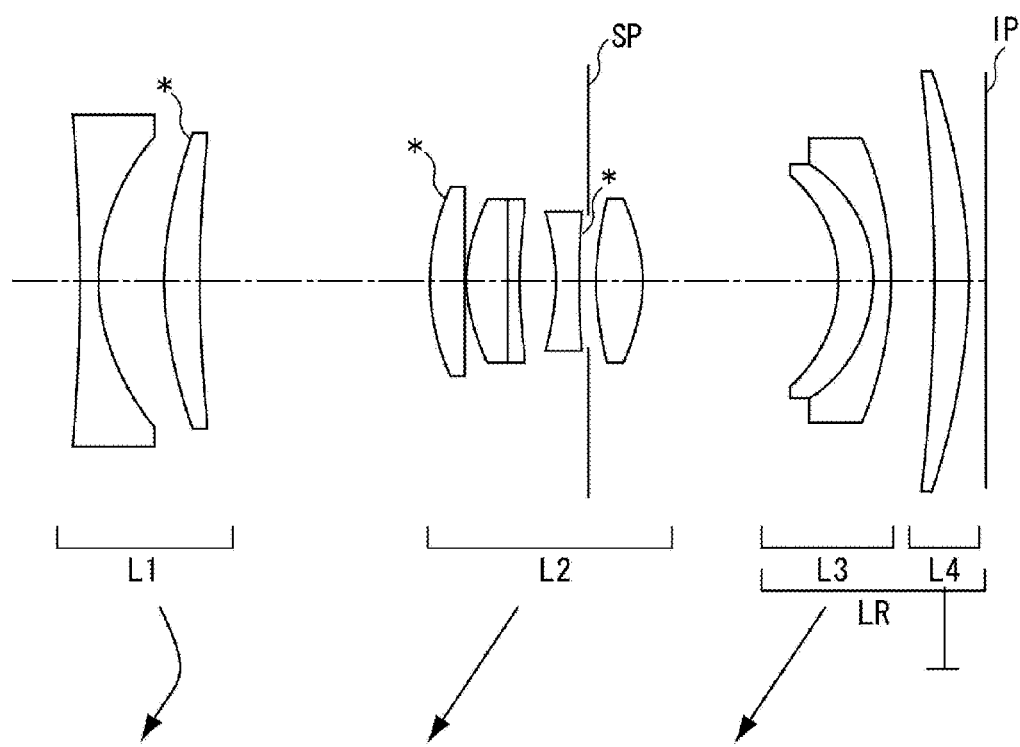
FIG. 3 is a cross sectional view of a zoom lens at the wide-angle end according to a second exemplary embodiment of the present invention.
Figure 4A:
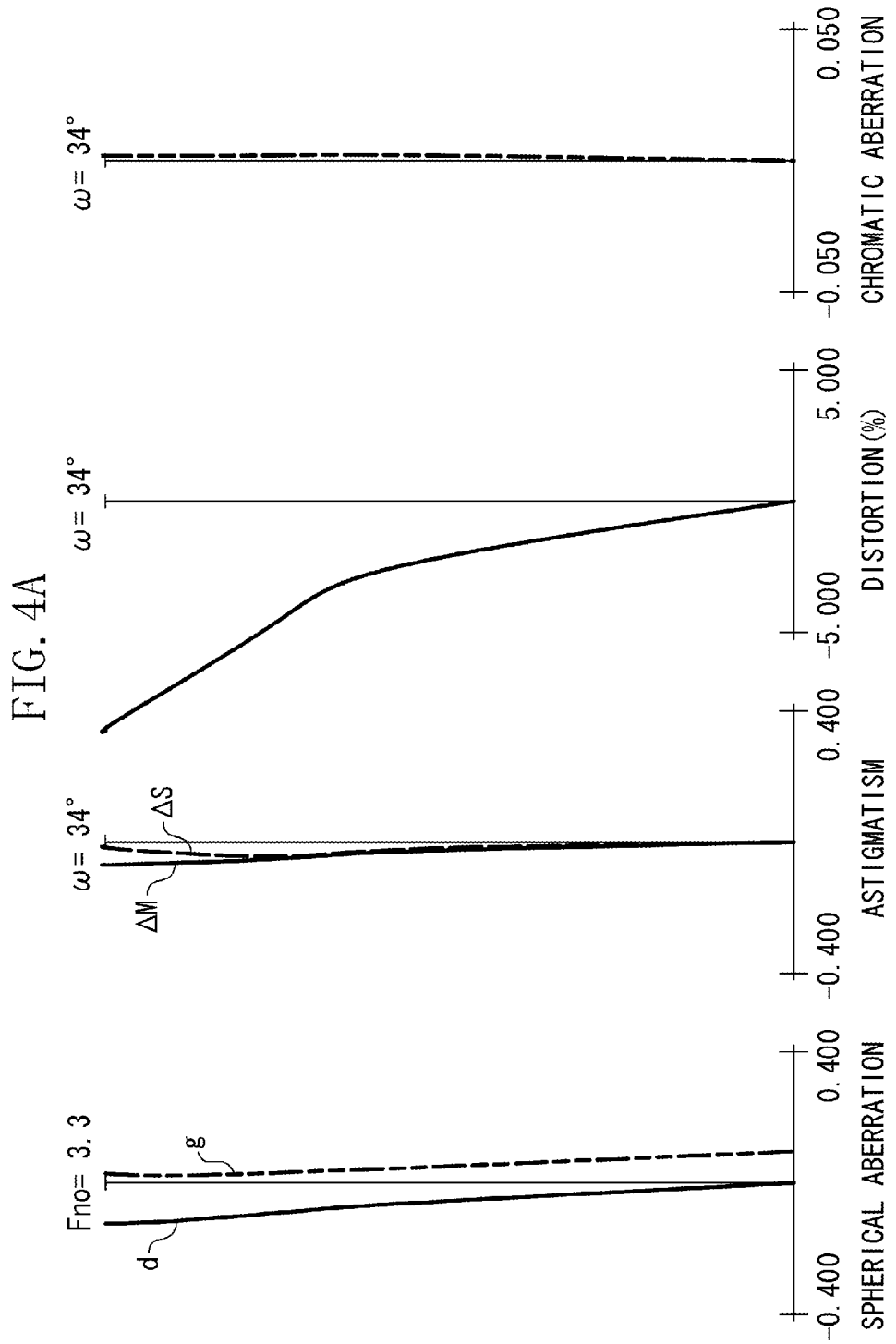

FIG. 3 is a cross sectional view of a zoom lens according to a second exemplary embodiment of the present invention at the wide-angle end. FIGS. 4A and 4B are aberration charts of the zoom lens according to the second exemplary embodiment at the wide-angle end and at the telephoto end, respectively, when focusing on an infinitely-distant object.

Figure 5:
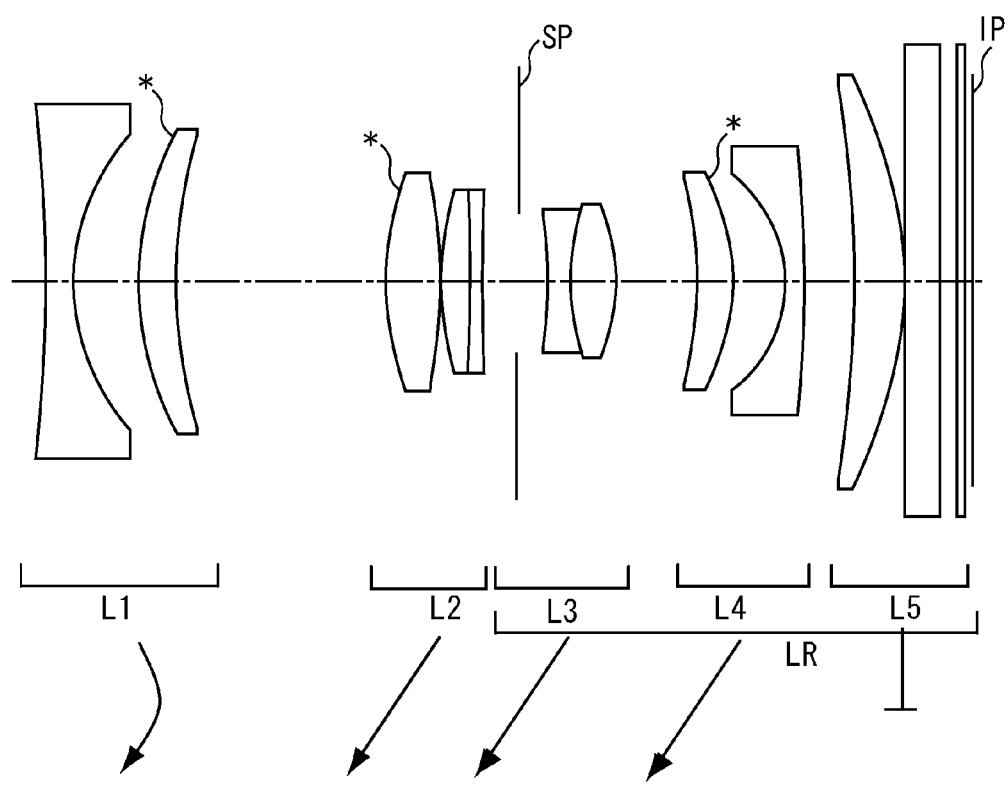
FIG. 5 is a cross sectional view of a zoom lens at the wide-angle end according to a third exemplary embodiment of the present invention.

FIG. 5 is a cross sectional view of a zoom lens according to a third exemplary embodiment of the present invention at the wide-angle end. FIGS. 6A and 6B are aberration charts of the zoom lens according to the third exemplary embodiment at the wide-angle end and at the telephoto end, respectively, when focusing on an infinitely-distant object.

Figure 7:
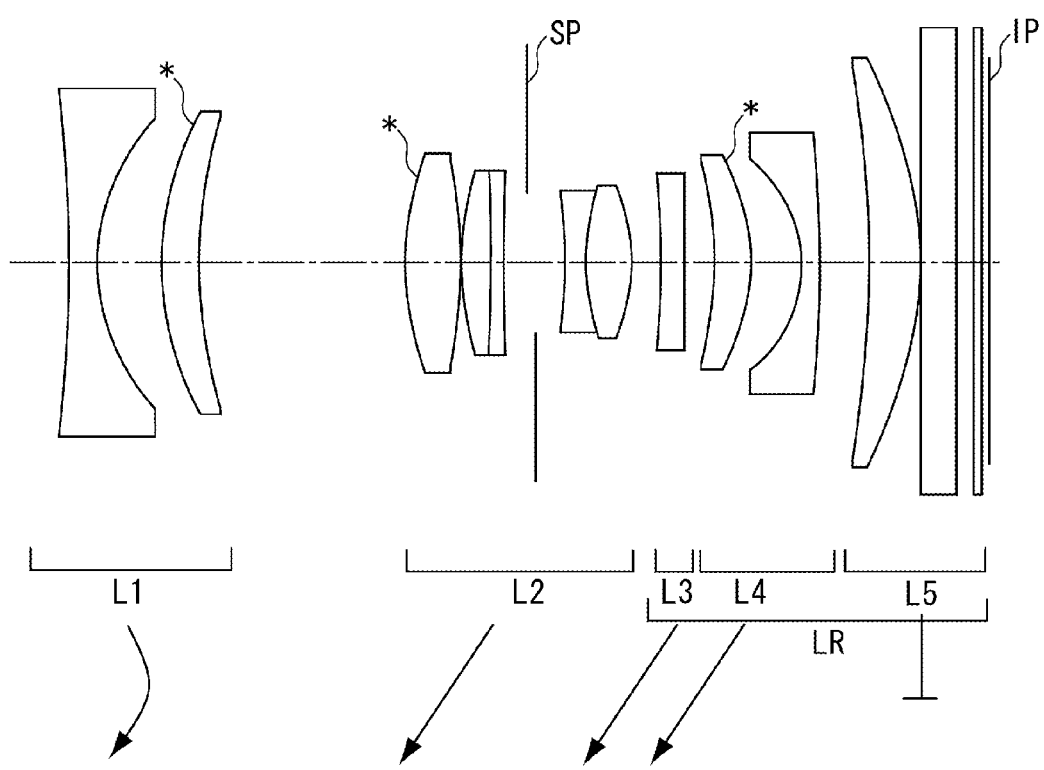
FIG. 7 is a cross sectional view of a zoom lens at the wide-angle end according to a fourth exemplary embodiment of the present invention.

FIG. 7 is a cross sectional view of a zoom lens according to a fourth exemplary embodiment of the present invention at the wide-angle end. FIGS. 8A and 8B are aberration charts of the zoom lens according to the fourth exemplary embodiment at the wide-angle end and at the telephoto end, respectively, when focusing on an infinitely-distant object.

Figure 9:
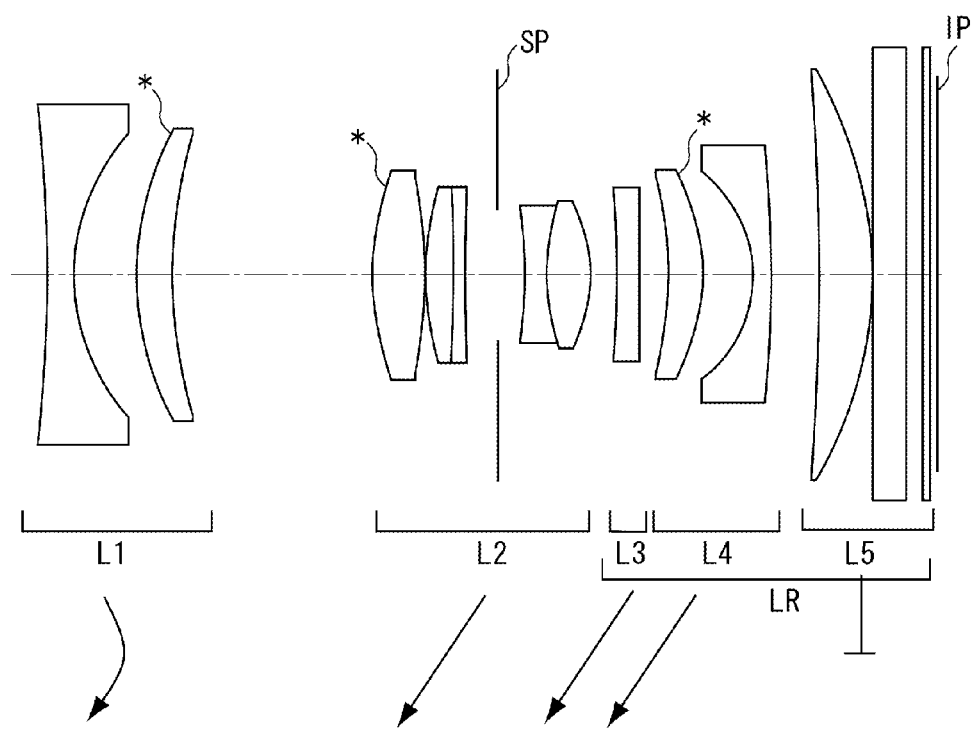
FIG. 9 is a cross sectional view of a zoom lens at the wide-angle end according to a fifth exemplary embodiment of the present invention.
Figure 10A:
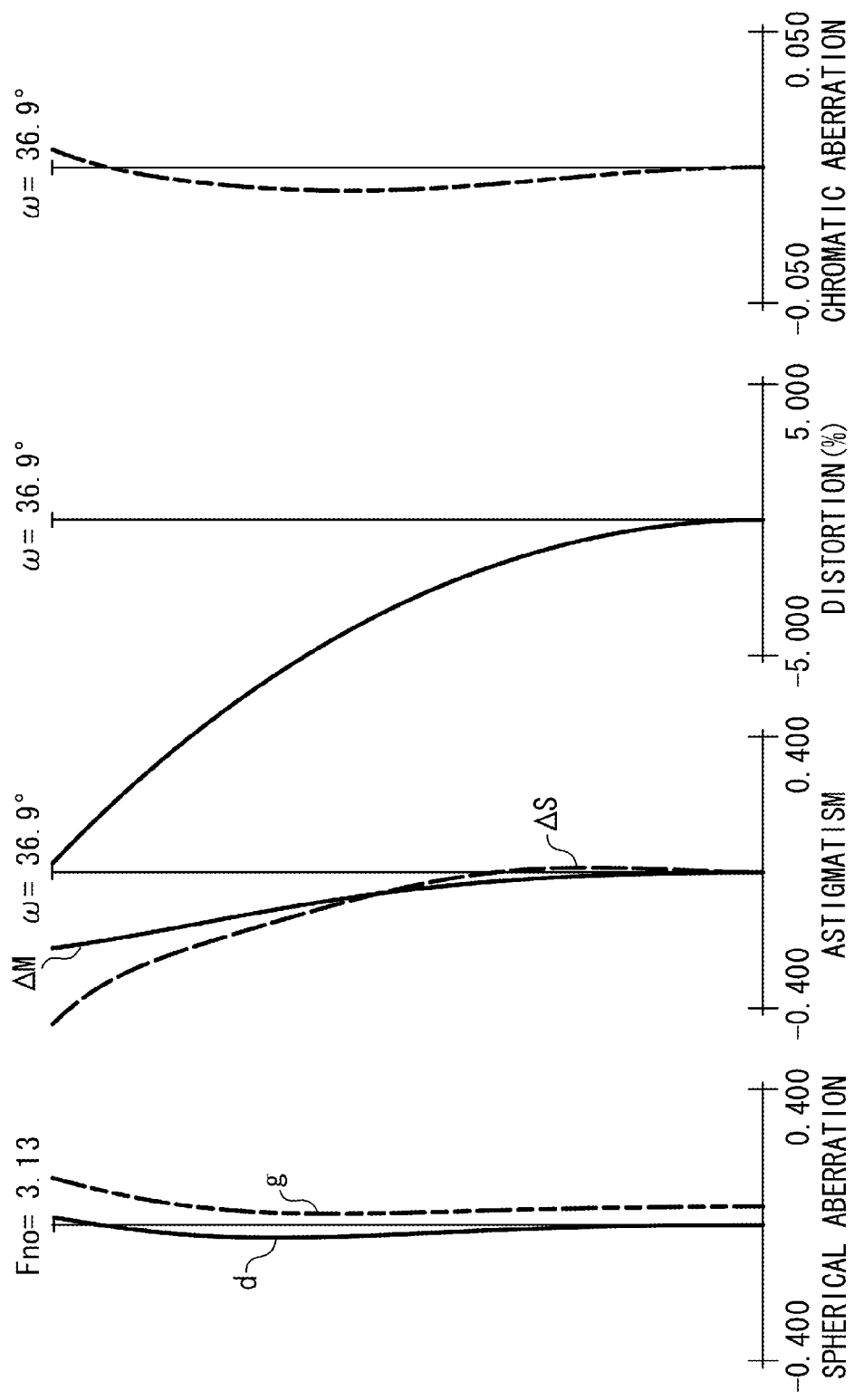
FIGS. 10A and 10B are aberration charts for the zoom lens according to the fifth exemplary embodiment at the wide-angle end and at the telephoto end, respectively.
Figure 10B:
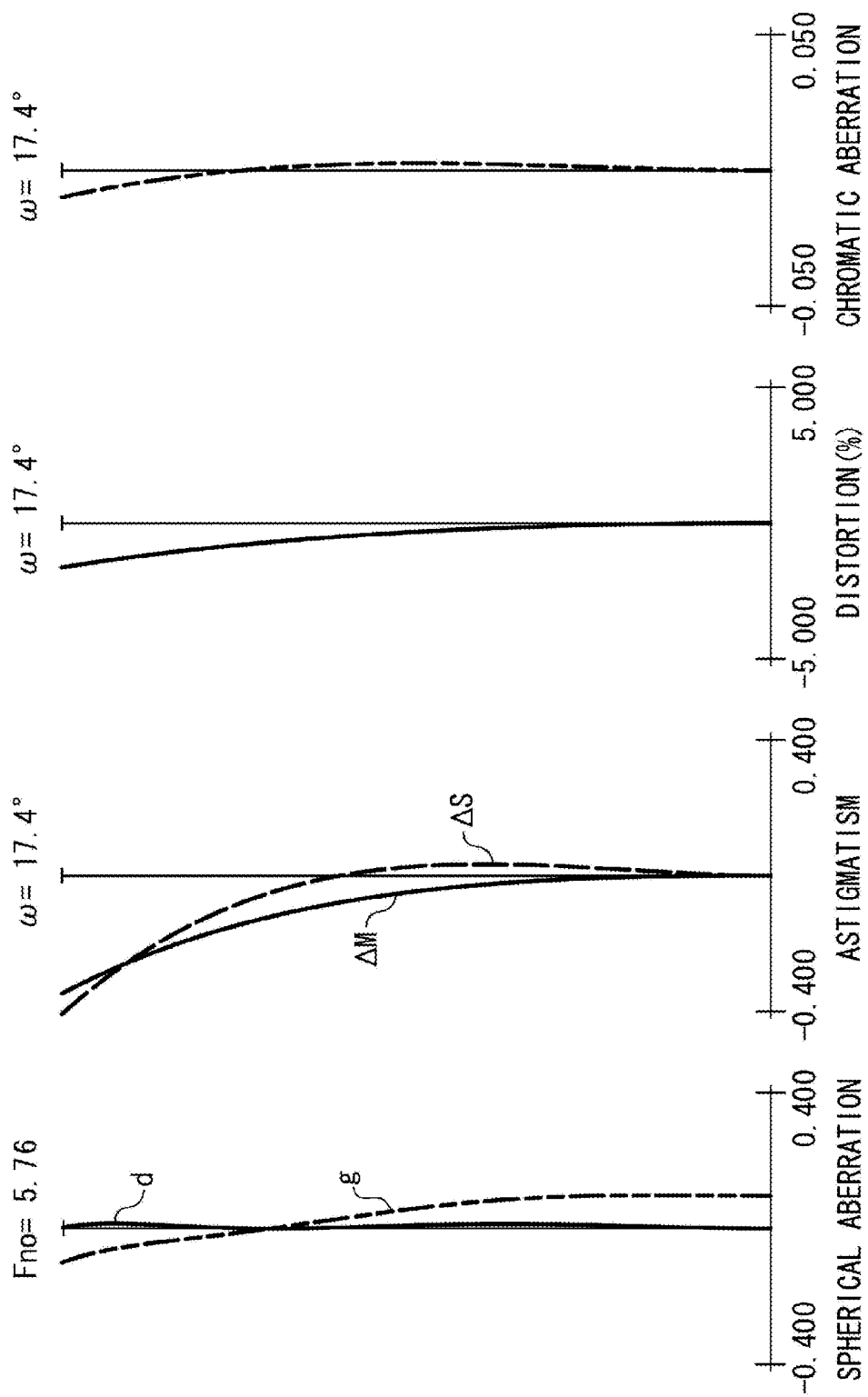
Figure 11:
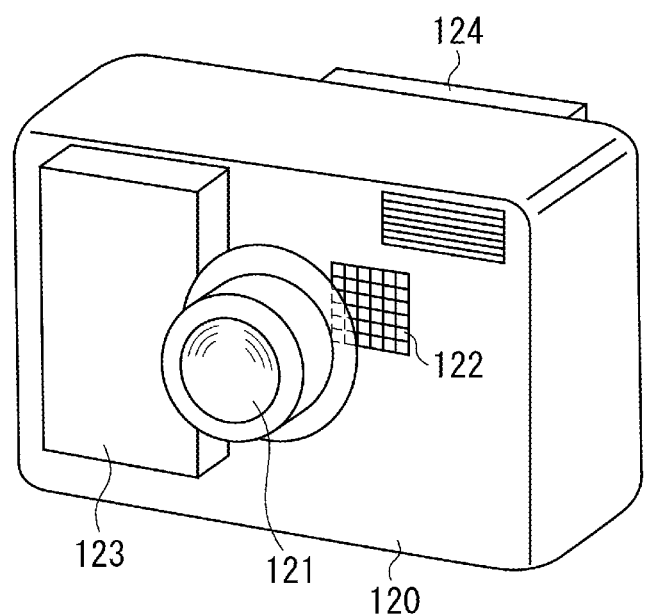
FIG. 11 illustrates exemplary a configuration of an image pickup apparatus according to an exemplary embodiment of the present invention.

FIG. 9 is a cross section of a zoom lens according to a fifth exemplary embodiment of the present invention at the wide-angle end. FIGS. 10A and 10B are aberration charts of the zoom lens according to the fifth exemplary embodiment at the wide-angle end and at the telephoto end, respectively, when focusing on an infinitely-distant object. FIG. 11 illustrates a configuration of a digital camera which is an example of an image pickup apparatus equipped with a zoom lens according to any of the first to fifth exemplary embodiments of the present invention.

The zoom lens according to each exemplary embodiment is a photographic lens system (optical system) used for an image pickup apparatus, such as a video camera, a digital camera, or a silver-halide film camera.

In each of the diagrams showing a cross sectional view of the zoom lens (FIGS. 1, 3, 5, 7, and 9), an object side (front side) is illustrated at the left-hand portion of the drawing, and an image side (rear side) is illustrated at the right-hand portion thereof. Furthermore, in each of the diagrams showing a cross sectional view of the zoom lens (FIGS. 1, 3, 5, 7, and 9), "i" (where i denotes a positive integer equal to or greater than 1) denotes an order of a lens unit seen from the object side towards the image side. "Li" denotes an i-th lens unit. "LR" denotes a rear lens group.

"SP" denotes an aperture stop. "IP" denotes an image plane. The image plane IP is, when the zoom lens according to an exemplary embodiment of the present invention is used as a photographic optical system of a video camera or a digital camera, equivalent to an imaging surface of a solid-state image sensor (photoelectric conversion element), such as a charge-coupled device (CCD) sensor or a complementary metal-oxide semiconductor (CMOS) sensor.

In each of the diagrams showing a cross sectional view of the zoom lens (FIGS. 1, 3, 5, 7, and 9), an arrow denotes a locus of movement of each lens unit during zooming from the wide-angle end to the telephoto end. An asterisk (*) indicates that the corresponding lens surface has an aspheric shape.

In a portion of the aberration chart (FIGS. 2A and 2B, 4A and 4B, 6A and 6B, 8A and 8B, and 10A and 10B) showing spherical aberration, the spherical aberration is represented with respect to d-line light and g-line light. In a portion of the aberration chart (FIGS. 2A and 2B, 4A and 4B, 6A and 6B, 8A and 8B, and 10A and 10B) showing astigmatism, "ΔM" and "ΔS" respectively denote a meridional image plane and a sagittal image plane, respectively, with respect to d-line light. "Fno" denotes an F-number. "ω" denotes a half angle of view.

In each of the following exemplary embodiments, each of the wide-angle end and the telephoto end refers to a zooming position when a magnification varying lens unit is positioned at each of the ends of a range in which the magnification varying lens unit can mechanically move along the optical axis.

The zoom lens according to an exemplary embodiment includes, in order from the object side to the image side and arranged along an optical axis thereof, a first lens unit L1 having a negative refractive power, a second lens unit L2 having a positive refractive power, and a rear lens group LR; the rear lens group LR includes two or more lens units.

The first lens unit L1 and the second lens unit L2 move during zooming. The rear lens group LR includes a plurality of lens units in order from the object side to the image side, which are described below in accordance with each disclosed embodiment.

In the first and the second exemplary embodiments (FIGS. 1 and 3), the rear lens group LR is constituted by a third lens unit L3 (a lens unit LN) having a negative refractive power and a fourth lens unit L4 (a lens unit LP) having a positive refractive power. The third lens unit L3 (i.e., the lens unit LN) moves during zooming.

In the third exemplary embodiment (FIG. 5), the rear lens group LR is constituted by a third lens unit L3 having a positive refractive power and a fourth lens unit L4 (the lens unit LN) having a negative refractive power and a fifth lens unit L5 (the lens unit LP) having a positive refractive power. The third lens unit L3 and the fourth lens unit L4 (the lens unit LN) move during zooming.

In the fourth and the fifth exemplary embodiments (FIGS. 7 and 9), the rear lens group LR is constituted by a third lens unit L3 having a negative refractive power, a fourth lens unit L4 (the lens unit LN) having a negative refractive power, and a fifth lens unit L5 (the lens unit LP) having a positive refractive power. The third lens unit L3 and the fourth lens unit L4 (the lens unit LN) move during zooming.

In each exemplary embodiment, fp and fn respectively denote focal lengths of the lens unit LP and the lens unit LN, and fw and ft denote focal lengths of the entire optical system at the wide-angle end and at the telephoto end, respectively. Furthermore, fni is a focal length of an i-th lens from the object side among lenses constituting the lens unit LN; and vdni is an Abbe number (with respect to the Fraunhofer d-line light 587.6 nm) of a material of the i-th lens among lenses constituting the lens unit LN. In each exemplary embodiment, the following conditions are satisfied.

$$0.66 < |fn/\sqrt{(fw \cdot ft)}| < 0.78 \quad (1)$$

$$1.6 < |fp/fn| < 5.3 \quad (2)$$

$$|\Sigma((1/(vdni) \times (\sqrt{(fw \cdot ft)}/fni))| < 0.023 \quad (3).$$

In the above conditional expressions (and those that follow), the symbol "√" stands for "square root" and the dot "·" symbol indicates multiplication.

In the negative lead type zoom lens according to each exemplary embodiment, in order to achieve a small-size zoom lens (a lens whose total length is short) and a wide angle of view at the same time, chromatic aberration of magnification may increase. In addition, the angle of incidence of light of a light flux incident on an image plane may become large.

The conventional method described in the "Related Art" section does not describe a method for reducing the angle of incidence of light and for correcting chromatic aberration of magnification when the total size of the entire zoom lens is reduced and the angle of view is increased. In each exemplary embodiment of the present invention, the total size of the zoom lens is reduced by increasing the power (refractive power) of the lens unit LN. Furthermore, the balance between powers assigned to the lens unit LN and the lens unit LP is appropriately set based on specifically determined mathematical conditions. Accordingly, each exemplary embodiment of the present invention can reduce the angle of incidence of light of a light flux incident on the image sensor (image plane) and provide a compact sized zoom lens.

In addition, in each exemplary embodiment, the power of each lens included in the lens unit LN, whose power is increased when the size of the entire zoom lens is reduced, and the material of each lens included in the lens unit LN are appropriately set. Accordingly, each exemplary embodiment can effectively correct chromatic aberration of magnification, which may become problematic when the angle of view is increased.

More specifically, by providing and using the condition (1), which provides a condition for the power assigned to the lens unit LN, and the condition (2), which provides a condition for the balance between the powers of the lens unit LN and the lens unit LP, each exemplary embodiment can reduce the size of the entire zoom lens and control the angle of incidence of light of a light flux incident on the image plane within an appropriate range.

In addition, by using the condition (3), which provides a condition for the power assigned to each lens included in the lens unit LN and the material of the lens included in the lens unit LN, each exemplary embodiment can effectively achieve a wide angle of view and control chromatic aberration of magnification, which may arise as a side effect of the increase in the angle of view, within tolerance.

With the above-described configuration, each exemplary embodiment can achieve a zoom lens whose total size is small, in which the angle of incidence of a light flux incident on the image sensor is low, having a short focal length at the wide-angle end, and which is capable of effectively correcting chromatic aberration of magnification. The angle of incidence of light refers to an angle of incidence of light when the principal ray is incident on the image plane (the image sensor).

The condition (1) provides a condition for the range of the power assigned to the lens unit LN, which is useful in order to achieve a small-size zoom lens. If the upper limit value of the condition (1) is exceeded, then the power of the lens unit LN may become excessively low. In this case, it becomes difficult to reduce the size of the entire zoom lens. On the other hand, if the lower limit value of the condition (1) is exceeded, then the power of the lens unit LN may become excessively large. In this case, the angle of incidence of light may increase.

The condition (2) provides a condition for the range of the power of the lens unit LP, which is useful in order to reduce the angle of incidence of light. If the upper limit value of the condition (2) is exceeded, then the power of the lens unit LP may become excessively low. As a result, it becomes difficult to reduce the angle of incidence of light, which has been increased by the lens unit LN. On the other hand, if the lower limit value of the condition (2) is exceeded, then the power of the lens unit LP may become excessively high. In this case, the effect of reducing the total size of the zoom lens by the lens unit LN may be set off. As a result, it becomes difficult to reduce the total size of the zoom lens.

The condition (3) provides a condition for the range of the power assigned to each lens constituting the lens unit LN and the material useful in order to reduce chromatic aberration of magnification. If the upper limit value of the condition (3) is exceeded, then chromatic aberration that may occur in the lens unit LN may increase. As a result, it becomes difficult to correct chromatic aberration of magnification.

In order to easily reduce the total size of the zoom lens, it is further useful if the range of the value in the condition (1) is altered as follows:

$$0.66 < |fn/\sqrt{fw \cdot ft}| < 0.74 \quad (1a).$$

In order to more effectively reduce the angle of incidence of light, it is further useful if the range of the value in the condition (2) is altered as follows:

$$1.6 < |fp/fn| < 5.0 \quad (2a).$$

It is further useful if the range of the value in the condition (3) is altered as follows:

$$|\Sigma((1/(vdni) \times (\sqrt{(fw \cdot ft)}/fni))| < 0.021 \quad (3a).$$

With the above-described configuration, each exemplary embodiment of the present invention can achieve a zoom lens whose total size is small, in which the angle of incidence of light of a light flux incident on the image sensor is sufficiently low, which has a short focal length at the wide-angle end, and which is capable of effectively correcting chromatic aberration of magnification.

It is yet further useful if at least one of the following conditions is satisfied. More specifically, in each exemplary embodiment of the present invention, fnp is a focal length of a positive lens, which has the highest positive refractive power among the positive refractive powers of the lenses constituting the lens unit LN; and vnp is an Abbe number of a material of the positive lens having the highest positive refractive power among the positive refractive powers of the lenses constituting the lens unit LN. Furthermore, f1 is a focal length of the first lens unit L1. Rp1 is a radius of curvature of a lens surface on the object side of a positive lens having the highest positive refractive power among the positive refractive powers of the lenses constituting the lens unit LP. Rp2 is a radius of curvature of a lens surface on the image side of the positive lens having the highest positive refractive power among the positive refractive powers of the lenses constituting the lens unit LP. In addition, ndn is an average value of refractive indices of materials of lenses constituting the lens unit LN with respect to d-line light, and vnn is an Abbe number of a material of a lens having a highest negative refractive power among the lenses constituting the lens unit LN. In the zoom lens according to each exemplary embodiment, at least one of the following conditions is satisfied:

$$2.0<|fnp/fnn|<6.0 \quad (4)$$

$$1.2<f1/fn<1.8 \quad (5)$$

$$-0.85<(Rp2-Rp1)/(Rp2+Rp1)<-0.33 \quad (6)$$

$$1.5<vnn/vnp<4.0 \quad (7)$$

$$1.7<ndn<2.2 \quad (8)$$

Now, a technical significance of each condition will be described in detail below.

The condition (4) provides a condition for a range of the ratio of powers between the power of the positive lens having the highest power among the powers of the lenses constituting the lens unit LN and the power of the negative lens having the highest power among the lenses constituting the lens unit LN, which is useful in order to effectively reduce the total size of the zoom lens and to effectively correct chromatic aberration of magnification.

If the upper limit value of the condition (4) is exceeded, then the power of the positive lens becomes excessively low. In this case, achromatism within the lens unit LN may not be effectively executed. On the other hand, if the lower limit value of the condition (4) is exceeded, then the power of the positive lens may become excessively high. In this case, the power of the lens unit LN may become excessively low. As a result, it may become difficult to reduce the total size of the zoom lens.

In order to more easily correct chromatic aberration of magnification, it is further useful if the range of the value in the condition (4) is altered as follows:

$$2.5<|fnp/fnn|<6.0 \quad (4a)$$

The condition (5) provides a condition for the range of the ratio between the focal lengths of the first lens unit L1 and the lens unit LN. If the upper limit value of the condition (5) is exceeded, then the power of the first lens unit L1 becomes excessively low. In this case, the asymmetry within the optical system may be lost. As a result, it may become difficult to effectively correct chromatic aberration of magnification. On the other hand, if the lower limit value of the condition (5) is exceeded, then the power of the first lens unit L1 may become excessively high. As a result, it may become difficult to reduce the total size of the zoom lens.

In order to more effectively correct chromatic aberration of magnification, it is further useful if the range of the value in the condition (5) is altered as follows:

$$1.20<f1/fn<1.70 \quad (5a)$$

The condition (6) provides a condition for the range of the shape of the positive lens which has the highest power among the lenses constituting the lens unit LP. If the upper limit value of the condition (6) is exceeded, then the radius of curvature of the lens surface of the positive lens on the object side may become too close to the radius of curvature of the lens surface of the positive lens on the image side. As a result, it may become difficult to assign an appropriate power to the positive lens.

On the other hand, if the lower limit value of the condition (5) is exceeded, then the surfaces of the positive lens on the object side and on the image side may take the following shapes. More specifically, the surface of the positive lens on the object side becomes flat while the lens surface of the positive lens on the image side may become convex. In other words, in this case, the positive lens may take a flat-convex-like shape. Compared with the meniscus shape, in which the lens has a convex shape on the surface on the image side, positive distortion may more easily occur on the telephoto end.

In order to more effectively reduce distortion at the telephoto end, it is further useful if the range of the value in the condition (6) is altered as follows:

$$-0.80<(Rp2-Rp1)/(Rp2+Rp1)<-0.35 \quad (6a)$$

The condition (7) provides a condition for the range of the ratio between the Abbe numbers of the material of the negative lens having the highest power among the lenses constituting the lens unit LN and the material of the positive lens having the highest power among the lenses constituting the lens unit LN. If the upper limit value of the condition (7) is exceeded, then the Abbe number of the material of the negative lens may become excessively high. In this case, it is required to select a glass material having a low refractive index. Accordingly, the radius of curvature of the lens surface of the negative lens may become low. As a result, it may become difficult to reduce the total size of the zoom lens.

On the other hand, if the lower limit value of the condition (7) is exceeded, then the Abbe number of the material of the positive lens may become close to the Abbe number of the material of the negative lens. Accordingly, the powers thereof may become high. In this case, the radius of curvature of each lens surface of each of the positive lens and the negative lens may become low. As a result, it may become difficult to reduce the total size of the zoom lens.

In order to more effectively correct chromatic aberration of magnification while more easily reducing the total size of the zoom lens, it is further useful if the range of the value in the condition (7) is altered as follows:

$$1.5<vnn/vnp<3.8 \quad (7a)$$

The condition (8) provides a condition for the range of an average refractive index of the material of each lens included in the lens unit LN with respect to d-line light. If the lower limit value of the condition (8) is exceeded, then the radius of curvature of the lens surface may decrease. As a result, it may become difficult to reduce the total size of the zoom lens.

On the other hand, if the upper limit value of the condition (8) is exceeded, then it may become difficult to set a high ratio between the Abbe numbers. As a result, it may become difficult to effectively correct chromatic aberration of magnification. It is further useful if the range of the value in the condition (8) is altered as follows:

$$1.75<ndn<2.10 \quad (8a)$$

If the zoom lens according to each exemplary embodiment is used in an image pickup apparatus, distortion at the wide-angle end can be corrected by electronic distortion correction. In each exemplary embodiment, negative distortion may occur at the wide-angle end. Accordingly, a high quality image can be achieved which has only a small amount of distortion by correcting the distortion by the electronic distortion correction.

Now, an exemplary lens configuration of the zoom lens according to each exemplary embodiment of the present invention will be described in detail below.

To begin with, an exemplary lens configuration of the zoom lens according to the first exemplary embodiment will be described in detail below with reference to FIG. 1. Referring to FIG. 1, the zoom lens according to the present exemplary embodiment includes, in order from the object side to the image side and aligned along an optical axis thereof, a first lens unit L1 having a negative refractive power, a second lens unit L2 having a positive refractive power, a third lens unit L3 having a negative refractive power (the lens unit LN), and a fourth lens unit L4 having a positive refractive power (the lens unit LP).

The aperture stop SP is included in the second lens unit L2. In addition, the aperture stop SP moves integrally with the second lens unit L2 during zooming. Focusing is executed by the first lens unit L1 or the third lens unit L3.

In the present exemplary embodiment, the power (refractive power) of the third lens unit L3 is increased. In addition, the power of the fourth lens unit L4 is set lower than the power of the third lens unit L3. Accordingly, the present exemplary embodiment can reduce the total lens length and also reduce the angle of incidence of light of a light flux incident on the image plane.

In addition, the power and the material of each lens constituting the third lens unit L3 are set to satisfy the condition (3) to effectively correct chromatic aberration of magnification. In the present exemplary embodiment, the maximum value of the angle of incidence of light of a light flux incident on the image plane is 26.8°.

Now, an exemplary lens configuration of the zoom lens according to the second exemplary embodiment will be described in detail below with reference to FIG. 3.

Referring to FIG. 3, the zoom lens according to the present exemplary embodiment has the same number of lens units as the zoom lens according to the first exemplary embodiment. In addition, in the zoom lens according to the present exemplary embodiment, the power is assigned to each lens of the lens units with the same power arrangement as that in the first exemplary embodiment. The present exemplary embodiment sets an appropriately low power to the positive lens and the negative lens by setting a ratio between the Abbe numbers of the materials of the positive lens having the highest power and the negative lens having the highest power which is higher than that in other exemplary embodiments of the present invention. In the present exemplary embodiment, the maximum value of the angle of incidence of light of a light flux incident on the image plane is 26.2°.

An exemplary lens configuration of the zoom lens according to the third exemplary embodiment will be described in detail below with reference to FIG. 5. Referring to FIG. 5, the zoom lens according to the present exemplary embodiment includes, in order from the object side to the image side, a first lens unit L1 having a negative refractive power, a second lens unit L2 having a positive refractive power, a third lens unit L3 having a positive refractive power, and a fourth lens unit L4 having a negative refractive power (the lens unit LN). In addition, the zoom lens according to the present exemplary embodiment includes a fifth lens unit L5 having a positive refractive power (the lens unit LP).

The aperture stop SP is provided on the object side of the third lens unit L3. In addition, the aperture stop SP moves integrally with the third lens unit L3 during zooming. Focusing is executed by the first lens unit L1 or the fourth lens unit L4.

Similar to the first and the second exemplary embodiments described above, the zoom lens according to the present exemplary embodiment can correct chromatic aberration of magnification while effectively reducing the lens total length and reducing the angle of incidence of light of the light flux incident on the image plane.

In the present exemplary embodiment, more movable lens units are provided compared with the first and the second exemplary embodiments. Accordingly, the present exemplary embodiment can more easily achieve a high zoom ratio and correct variation of aberration for the entire zoom range. In addition, compared with the other exemplary embodiments of the present invention, the present exemplary embodiment more appropriately sets the radius of curvature of the lens surface on the object side of the positive lens included in the fifth lens unit L5, and the radius of curvature of the lens surface on the image side of the positive lens of the fifth lens unit L5.

If the radius of curvature of the lens surface on the object side of the positive lens is set excessively close to the radius of curvature of the lens surface on the image side of the positive lens, it may become difficult to appropriately set the power of the fifth lens unit L5. In the present exemplary embodiment, the radius of curvature of the lens surface on the object side of the positive lens and the radius of curvature on the image side of the lens surface of the positive lens are appropriately set within the range in which the power of the fifth lens unit L5 can be appropriately set.

With the above-described five-unit configuration, the present exemplary embodiment can effectively correct chromatic aberration of magnification while effectively reducing the lens total length and the angle of incidence of light of a light flux incident on the image plane. In the present exemplary embodiment, the maximum value of the angle of incidence of light of a light flux incident on the image plane is 28.5°.

An exemplary lens configuration of the zoom lens according to the fourth exemplary embodiment of the present invention will be described in detail below with reference to FIG. 7. Referring to FIG. 7, the zoom lens according to the present exemplary embodiment includes, in order from the object side to the image side, a first lens unit L1 having a negative refractive power, a second lens unit L2 having a positive refractive power, a third lens unit L3 having a negative refractive power, and a fourth lens unit L4 having a negative refractive power (the lens unit LN). In addition, the zoom lens according to the present exemplary embodiment includes a fifth lens unit L5 having a positive refractive power (the lens unit LP).

The aperture stop SP is provided in the second lens unit L2. In addition, the aperture stop SP moves integrally with the second lens unit L2 during zooming. Focusing is executed by the first lens unit L1 or the fourth lens unit L4.

Similar to the first and the second exemplary embodiments described above, the zoom lens according to the present exemplary embodiment can correct chromatic aberration of magnification while effectively reducing the lens total length and reducing the angle of incidence of light of the light flux incident on the image plane.

With the above-described five-unit configuration, the present exemplary embodiment can effectively correct chromatic aberration of magnification while effectively reducing the lens total length and the angle of incidence of light of a light flux incident on the image plane. In the present exemplary embodiment, the maximum value of the angle of incidence of light of a light flux incident on the image plane is 27.3°.

An exemplary lens configuration of the zoom lens according to the fifth exemplary embodiment of the present invention will be described in detail below with reference to FIG. 9. Referring to FIG. 9, the zoom lens according to the present exemplary embodiment has the same number of lens units according to the fourth exemplary embodiment. In addition, in the zoom lens according to the present exemplary embodiment, the power is assigned to each lens of the lens units with the same power arrangement as that in the fourth exemplary embodiment.

The aperture stop SP is provided in the second lens unit L2. In addition, the aperture stop SP moves integrally with the second lens unit L2 during zooming. Focusing is executed by the first lens unit L1 or the fourth lens unit L4.

Similar to the first and the second exemplary embodiments described above, the zoom lens according to the present exemplary embodiment can correct chromatic aberration of magnification while effectively reducing the lens total length and reducing the angle of incidence of light of the light flux incident on the image plane.

In the zoom lens according to the present exemplary embodiment, unlike the other exemplary embodiments, the shape of the positive lens included in the fifth lens unit L5 is set close to the flat-convex shape, in which the lens surface on the object side has a flat shape.

If the shape of the positive lens included in the fifth lens unit L5 is set excessively close to the flat-convex shape, a large amount of positive distortion may occur at the telephoto end. In the present exemplary embodiment, the positive lens included in the fifth lens unit L5 is provided with a shape close to the flat-convex shape within a range in which it may not become difficult to correct distortion at the telephoto end. In the present exemplary embodiment, the maximum value of the angle of incidence of light of a light flux incident on the image plane is 24.7°.

Numerical examples 1 through 5, which respectively correspond to the first through the fifth exemplary embodiments of the present invention, are set forth below. In each of the numerical examples 1 through 5, "i" (where i is an integer equal to or greater than 1) denotes the order of a surface from the object side to the image side, "ri" denotes a radius of curvature of an i-th lens surface, "di" denotes the thickness of an i-th lens or an air space between the i-th and i-th+1 lens. In addition, "ndi" and "vdi" respectively denote a refractive index and an Abbe number of the material of the i-th lens with respect to d-line light. When a given surface is an aspherical surface, such surface is denoted by an asterisk "*" next to the surface number, and the aspheric shape is expressed as $$X=(1/R)Y^2/[1+\{1-(K+1)(Y/R)^2\}^{1/2}]+A4Y^4+A6Y^6+A8Y^8+A10Y^{10}\ldots$$

where "R" denotes a paraxial radius of curvature of the lens surface, the direction of the optical axis is taken on the X-axis, the direction normal to the optical axis is taken on the Y-axis, and "Aj" (where j=4, 6, 8, 10, . . . ) denotes an aspheric coefficient. The scientific notation "e-X" for each aspheric coefficient is equivalent to the exponential notation "×10$^{-X}$". In the numerical examples 1, 3, and 5, four lens surfaces from the image side are glass surfaces, such as a faceplate. The relationship between each condition (1) through (8) described above and each numerical example tabulated below is summarized in Table 1.

NUMERICAL EXAMPLE 1

| Unit: mm | | | | | |
|---|---|---|---|---|---|
| Surface Data | | | | | |
| Surface No. | r | d | nd | vd | Effective diameter |
| 1 | −96.288 | 1.80 | 1.77250 | 49.6 | 22.25 |
| 2 | 14.859 | 4.34 | | | 18.75 |
| 3* | 21.917 | 2.46 | 2.01960 | 21.5 | 19.09 |
| 4 | 35.824 | Variable | | | 18.45 |
| 5* | 19.378 | 3.63 | 1.59201 | 67.0 | 13.46 |
| 6 | −37.041 | 0.10 | | | 12.55 |
| 7 | 23.428 | 1.93 | 1.55332 | 71.7 | 11.14 |
| 8 | −75.050 | 0.80 | 1.84666 | 23.9 | 10.21 |
| 9 | 100.131 | 2.19 | | | 9.48 |
| 10 (Stop) | ∞ | 2.00 | | | 8.83 |
| 11* | −29.976 | 1.40 | 1.73077 | 40.5 | 8.30 |
| 12 | 14.572 | 0.00 | | | 8.79 |
| 13 | 14.572 | 3.03 | 1.55332 | 71.7 | 8.79 |
| 14 | −12.598 | Variable | | | 9.39 |
| 15 | −26.629 | 2.36 | 1.80486 | 24.7 | 12.78 |
| 16* | −14.939 | 3.46 | | | 13.47 |
| 17 | −9.182 | 1.20 | 1.80400 | 46.6 | 13.39 |
| 18 | −106.903 | Variable | | | 16.53 |
| 19 | −88.093 | 3.20 | 1.88300 | 40.8 | 25.64 |
| 20 | −28.441 | 0.10 | | | 26.17 |
| 21 | ∞ | 2.36 | 1.51680 | 64.2 | 30.00 |
| 22 | ∞ | 1.10 | | | 30.00 |
| 23 | ∞ | 0.50 | 1.51680 | 64.2 | 30.00 |
| 24 | ∞ | Variable | | | 30.00 |
| Image plane | ∞ | | | | |

| Aspheric Coefficients | | |
|---|---|---|
| R3 | K = 0.00000e+000 | A4 = 3.95173e−006 |
| | A6 = 1.86983e−008 | A8 = −2.57862e−011 |
| | A10 = 5.35818e−013 | |
| R5 | K = 0.00000e+000 | A4 = −3.60233e−005 |
| | A6 = 6.33323e−008 | A8 = −3.15737e−009 |
| | A10 = 2.19929e−011 | |
| R11 | K = 0.00000e+000 | A4 = −8.49559e−005 |
| | A6 = −8.88340e−008 | A8 = −1.25196e−008 |
| | A10 = 3.31415e−010 | |
| R16 | K = 0.00000e+000 | A4 = −1.48553e−005 |
| | A6 = −7.01648e−007 | A8 = 1.21614e−008 |
| | A10 = −1.83716e−010 | |

| Various Data Zoom Ratio 2.39 | | | |
|---|---|---|---|
| Focal Length | 18.20 | 31.19 | 43.58 |
| F-number | 3.15 | 4.44 | 5.76 |
| Angle of View | 34.62 | 23.65 | 17.40 |
| Image Height | 12.57 | 13.66 | 13.66 |
| Lens Total Length | 61.07 | 59.01 | 63.37 |
| BF | 0.50 | 0.50 | 0.50 |
| d4 | 13.81 | 4.23 | 1.07 |
| d14 | 5.43 | 6.19 | 5.95 |
| d18 | 3.38 | 10.14 | 17.90 |
| d24 | 0.50 | 0.50 | 0.50 |
| Entrance Pupil Position | 13.50 | 10.93 | 9.83 |
| Exit Pupil Position | −23.91 | −43.15 | −82.63 |

-continued

Unit: mm

|  | | | |
|---|---|---|---|
| Front Principal Point Position | 18.14 | 19.83 | 30.56 |
| Rear Principal Point Position | −17.70 | −30.69 | −43.08 |

Various Data of Each Lens Unit

| Lens Unit | First Surface | Focal Length | Lens Config. Length | Front Principal Point Position | Rear Principal Point Position |
|---|---|---|---|---|---|
| 1 | 1 | −26.64 | 8.60 | −0.55 | −7.25 |
| 2 | 5 | 17.51 | 15.07 | 4.22 | −9.28 |
| 3 | 15 | −20.00 | 7.02 | 5.70 | 0.23 |
| 4 | 19 | 46.40 | 7.25 | 2.45 | −2.29 |

Single Lens Data

| Lens | First Surface | Focal Length |
|---|---|---|
| 1 | 1 | −16.55 |
| 2 | 3 | 50.83 |
| 3 | 5 | 22.02 |
| 4 | 7 | 32.49 |
| 5 | 8 | −50.56 |
| 6 | 11 | −13.24 |
| 7 | 13 | 12.72 |
| 8 | 15 | 38.79 |
| 9 | 17 | −12.56 |
| 10 | 19 | 46.40 |
| 11 | 21 | 0.00 |
| 12 | 23 | 0.00 |

NUMERICAL EXAMPLE 2

Unit: mm

Surface Data

| Surface No. | r | d | nd | vd | Effective diameter |
|---|---|---|---|---|---|
| 1 | −99.788 | 1.14 | 1.77250 | 49.6 | 20.55 |
| 2 | 14.298 | 4.29 | | | 17.74 |
| 3* | 27.428 | 2.28 | 1.83917 | 23.9 | 18.04 |
| 4 | 86.749 | Variable | | | 17.70 |
| 5* | 17.305 | 2.28 | 1.59201 | 67.0 | 11.28 |
| 6 | −317.878 | 0.10 | | | 10.61 |
| 7 | 10.898 | 2.66 | 1.48749 | 70.2 | 9.82 |
| 8 | −225.930 | 0.76 | 1.84666 | 23.9 | 9.19 |
| 9 | 33.841 | 2.33 | | | 8.82 |
| 10 | −14.544 | 1.52 | 1.74330 | 49.3 | 8.23 |
| 11* | 89.210 | 0.57 | | | 8.30 |
| 12 (Stop) | ∞ | 0.57 | | | 8.40 |
| 13 | 20.674 | 3.04 | 1.48749 | 70.2 | 9.14 |
| 14 | −11.176 | Variable | | | 9.83 |
| 15 | −9.217 | 2.28 | 1.94595 | 18.0 | 12.87 |
| 16 | −9.153 | 0.00 | | | 14.31 |
| 17 | −9.153 | 1.14 | 1.88300 | 40.8 | 14.31 |
| 18 | −24.477 | Variable | | | 17.20 |
| 19 | −107.212 | 2.28 | 1.69680 | 55.5 | 25.75 |
| 20 | −37.044 | Variable | | | 26.10 |
| Image plane | ∞ | | | | |

-continued

Unit: mm

Aspheric Coefficients

| R3 | K = 0.00000e+000 | A4 = 1.31943e−005 |
|---|---|---|
| | A6 = 7.55325e−008 | A8 = −1.31819e−010 |
| | A10 = 1.88226e−012 | |
| R5 | K = 0.00000e+000 | A4 = 6.38070e−005 |
| | A6 = 4.19393e−007 | A8 = 2.02153e−010 |
| | A10 = 1.94311e−011 | |
| R11 | K = 0.00000e+000 | A4 = 2.80499e−004 |
| | A6 = 1.87534e−006 | A8 = −6.89355e−008 |
| | A10 = 1.24876e−009 | |

Various Data  
Zoom Ratio 2.40

| | | | |
|---|---|---|---|
| Focal Length | 18.20 | 31.06 | 43.61 |
| F-number | 3.30 | 4.59 | 5.88 |
| Angle of View | 34.04 | 23.74 | 17.39 |
| Image Height | 12.29 | 13.66 | 13.66 |
| Lens Total Length | 58.72 | 55.70 | 59.03 |
| BF | 1.00 | 1.00 | 1.00 |
| d4 | 14.96 | 4.69 | 0.76 |
| d14 | 12.67 | 12.80 | 12.66 |
| d18 | 2.85 | 9.98 | 17.37 |
| d20 | 1.00 | 1.00 | 1.00 |
| Entrance Pupil Position | 14.11 | 11.80 | 10.66 |
| Exit Pupil Position | −19.96 | −32.73 | −49.68 |
| Front Principal Point Position | 16.50 | 14.26 | 16.75 |
| Rear Principal Point Position | −17.20 | −30.06 | −42.61 |

Various Data of Each Lens Unit

| Lens Unit | First Surface | Focal Length | Lens Config. Length | Front Principal Point Position | Rear Principal Point Position |
|---|---|---|---|---|---|
| 1 | 1 | −27.99 | 7.71 | −1.71 | −8.38 |
| 2 | 5 | 17.59 | 13.83 | 5.33 | −8.31 |
| 3 | 15 | −19.07 | 3.42 | −1.37 | −3.39 |
| 4 | 19 | 80.16 | 2.28 | 2.03 | 0.70 |

Single Lens Data

| Lens | First Surface | Focal Length |
|---|---|---|
| 1 | 1 | −16.12 |
| 2 | 3 | 46.97 |
| 3 | 5 | 27.79 |
| 4 | 7 | 21.41 |
| 5 | 8 | −34.72 |
| 6 | 10 | −16.72 |
| 7 | 13 | 15.36 |
| 8 | 15 | 76.06 |
| 9 | 17 | −17.16 |
| 10 | 19 | 80.16 |

NUMERICAL EXAMPLE 3

Unit: mm

Surface Data

| Surface No. | r | d | nd | vd | Effective diameter |
|---|---|---|---|---|---|
| 1 | −104.055 | 1.80 | 1.77250 | 49.6 | 22.10 |
| 2 | 14.434 | 4.34 | | | 18.55 |
| 3* | 22.517 | 2.46 | 2.01960 | 21.5 | 18.92 |
| 4 | 37.699 | Variable | | | 18.30 |
| 5* | 19.542 | 3.63 | 1.59201 | 67.0 | 13.35 |
| 6 | −36.742 | 0.10 | | | 12.43 |
| 7 | 23.476 | 1.93 | 1.55332 | 71.7 | 11.06 |
| 8 | −69.168 | 0.80 | 1.84666 | 23.9 | 10.15 |
| 9 | 108.759 | Variable | | | 9.60 |
| 10 (Stop) | ∞ | 2.00 | | | 8.97 |
| 11* | −30.284 | 1.40 | 1.73077 | 40.5 | 8.45 |
| 12 | 14.520 | 0.00 | | | 8.87 |
| 13 | 14.622 | 3.03 | 1.55332 | 71.7 | 8.86 |
| 14 | −12.579 | Variable | | | 9.45 |
| 15 | −28.953 | 2.36 | 1.80486 | 24.7 | 12.75 |
| 16* | −15.406 | 3.46 | | | 13.40 |
| 17 | −9.066 | 1.20 | 1.80400 | 46.6 | 13.26 |
| 18 | −96.285 | Variable | | | 16.33 |
| 19 | −70.000 | 3.20 | 1.88300 | 40.8 | 24.77 |
| 20 | −30.000 | 0.10 | | | 25.61 |
| 21 | ∞ | 2.36 | 1.51680 | 64.2 | 30.00 |
| 22 | ∞ | 1.10 | | | 30.00 |
| 23 | ∞ | 0.50 | 1.51680 | 64.2 | 30.00 |
| 24 | ∞ | Variable | | | 30.00 |
| Image plane | ∞ | | | | |

Aspheric Coefficients

| | | |
|---|---|---|
| R3 | K = 0.00000e+000 | A4 = 6.50813e−006 |
| | A6 = −3.45539e−009 | A8 = 2.01386e−010 |
| | A10 = 3.32928e−013 | |
| R5 | K = 0.00000e+000 | A4 = −3.93427e−005 |
| | A6 = 1.54149e−007 | A8 = −2.95910e−009 |
| | A10 = −5.34047e−013 | |
| R11 | K = 0.00000e+000 | A4 = −8.13275e−005 |
| | A6 = −1.47658e−007 | A8 = −1.23034e−008 |
| | A10 = 3.30991e−010 | |
| R16 | K = 0.00000e+000 | A4 = −2.82144e−005 |
| | A6 = −5.96018e−007 | A8 = 1.03961e−008 |
| | A10 = −1.86056e−010 | |

Various Data
Zoom Ratio 2.40

| | | | |
|---|---|---|---|
| Focal Length | 18.20 | 31.21 | 43.61 |
| F-number | 3.15 | 4.44 | 5.76 |
| Angle of View | 34.62 | 23.64 | 17.39 |
| Image Height | 12.57 | 13.66 | 13.66 |
| Lens Total Length | 61.06 | 59.07 | 63.45 |
| BF | 0.48 | 0.48 | 0.48 |
| d4 | 13.81 | 4.32 | 1.21 |
| d9 | 2.18 | 2.16 | 2.13 |
| d14 | 5.43 | 6.18 | 5.92 |
| d18 | 3.39 | 10.16 | 17.95 |
| d24 | 0.48 | 0.48 | 0.48 |
| Entrance Pupil Position | 13.36 | 10.84 | 9.76 |
| Exit Pupil Position | −22.48 | −37.99 | −64.26 |
| Front Principal Point Position | 17.14 | 16.73 | 24.00 |
| Rear Principal Point Position | −17.72 | −30.73 | −43.12 |

Various Data of Each Lens Unit

| Lens Unit | First Surface | Focal Length | Lens Config. Length | Front Principal Point Position | Rear Principal Point Position |
|---|---|---|---|---|---|
| 1 | 1 | −26.15 | 8.60 | −0.56 | −7.28 |
| 2 | 5 | 17.48 | 6.46 | 0.83 | −3.22 |
| 3 | 10 | 89.74 | 6.43 | 12.06 | 8.20 |
| 4 | 15 | −20.30 | 7.02 | 5.85 | 0.34 |
| 5 | 19 | 57.31 | 7.25 | 2.86 | −1.86 |

Single Lens Data

| Lens | First Surface | Focal Length |
|---|---|---|
| 1 | 1 | −16.30 |
| 2 | 3 | 50.69 |
| 3 | 5 | 22.08 |
| 4 | 7 | 31.91 |
| 5 | 8 | −49.83 |
| 6 | 11 | −13.26 |
| 7 | 13 | 12.73 |
| 8 | 15 | 37.96 |
| 9 | 17 | −12.52 |
| 10 | 19 | 57.31 |
| 11 | 21 | 0.00 |
| 12 | 23 | 0.00 |

NUMERICAL EXAMPLE 4

Unit: mm

Surface Data

| Surface No. | r | d | nd | vd | Effective diameter |
|---|---|---|---|---|---|
| 1 | −93.313 | 1.80 | 1.77250 | 49.6 | 22.09 |
| 2 | 14.785 | 4.34 | | | 18.62 |
| 3* | 21.599 | 2.46 | 2.01960 | 21.5 | 18.96 |
| 4 | 34.169 | Variable | | | 18.30 |
| 5* | 18.788 | 3.63 | 1.59201 | 67.0 | 13.60 |
| 6 | −35.901 | 0.10 | | | 12.73 |
| 7 | 23.208 | 1.93 | 1.55332 | 71.7 | 11.26 |
| 8 | −90.367 | 0.80 | 1.84666 | 23.9 | 10.32 |
| 9 | 96.686 | 2.19 | | | 9.63 |
| 10 (Stop) | ∞ | 2.00 | | | 8.94 |
| 11* | −29.399 | 1.40 | 1.73077 | 40.5 | 8.39 |
| 12 | 14.505 | 0.00 | | | 8.85 |
| 13 | 14.638 | 3.03 | 1.55332 | 71.7 | 8.84 |
| 14 | −10.885 | Variable | | | 9.38 |
| 15 | −67.890 | 1.50 | 1.51633 | 64.2 | 10.40 |
| 16 | 217.261 | Variable | | | 10.94 |
| 17 | −27.159 | 2.36 | 1.80486 | 24.7 | 12.50 |
| 18* | −15.000 | 3.46 | | | 13.22 |
| 19 | −9.147 | 1.20 | 1.80400 | 46.6 | 13.24 |
| 20 | −109.089 | Variable | | | 16.38 |
| 21 | −88.284 | 3.20 | 1.88300 | 40.8 | 25.58 |
| 22 | −28.458 | 0.10 | | | 26.13 |

-continued

Unit: mm

| | | | | | |
|---|---|---|---|---|---|
| 23 | ∞ | 2.36 | 1.51680 | 64.2 | 30.00 |
| 24 | ∞ | 1.10 | | | 30.00 |
| 25 | ∞ | 0.50 | 1.51680 | 64.2 | 30.00 |
| 26 | ∞ | Variable | | | 30.00 |
| Image plane | ∞ | | | | |

Aspheric Coefficients

| | | |
|---|---|---|
| R3 | K = 0.00000e+000 | A4 = 3.93995e−006 |
| | A6 = 5.19865e−009 | A8 = −5.76208e−011 |
| | A10 = 1.30768e−012 | |
| R5 | K = 0.00000e+000 | A4 = −3.90943e−005 |
| | A6 = 5.14878e−008 | A8 = −3.27170e−009 |
| | A10 = 2.02039e−011 | |
| R11 | K = 0.00000e+000 | A4 = −1.33975e−004 |
| | A6 = −2.84731e−007 | A8 = −1.25955e−008 |
| | A10 = 3.31385e−010 | |
| R18 | K = 0.00000e+000 | A4 = −2.77017e−005 |
| | A6 = −6.65061e−007 | A8 = 1.21342e−008 |
| | A10 = −1.84742e−010 | |

Various Data
Zoom Ratio 2.40

| | | | |
|---|---|---|---|
| Focal Length | 18.20 | 31.44 | 43.61 |
| F-number | 3.13 | 4.43 | 5.76 |
| Angle of View | 34.63 | 23.48 | 17.39 |
| Image Height | 12.57 | 13.66 | 13.66 |
| Lens Total Length | 61.15 | 59.19 | 63.96 |
| BF | 0.57 | 0.57 | 0.57 |
| d4 | 13.81 | 4.33 | 1.60 |
| d14 | 1.93 | 2.69 | 2.45 |
| d16 | 2.00 | 2.00 | 1.99 |
| d20 | 3.39 | 10.15 | 17.91 |
| d26 | 0.57 | 0.57 | 0.57 |
| Entrance Pupil Position | 13.38 | 10.91 | 10.00 |
| Exit Pupil Position | −23.30 | −42.06 | −80.45 |
| Front Principal Point Position | 17.70 | 19.16 | 30.13 |
| Rear Principal Point Position | −17.63 | −30.87 | −43.04 |

Various Data of Each Lens Unit

| Lens Unit | First Surface | Focal Length | Lens Config. Length | Front Principal Point Position | Rear Principal Point Position |
|---|---|---|---|---|---|
| 1 | 1 | −25.71 | 8.60 | −0.39 | −7.05 |
| 2 | 5 | 16.30 | 15.07 | 5.12 | −8.95 |
| 3 | 15 | −100.00 | 1.50 | 0.24 | −0.75 |
| 4 | 17 | −20.00 | 7.02 | 5.76 | 0.27 |
| 5 | 21 | 46.40 | 7.25 | 2.44 | −2.30 |

Single Lens Data

| Lens | First Surface | Focal Length |
|---|---|---|
| 1 | 1 | −16.40 |
| 2 | 3 | 52.41 |
| 3 | 5 | 21.36 |
| 4 | 7 | 33.58 |
| 5 | 8 | −55.06 |
| 6 | 11 | −13.11 |
| 7 | 13 | 11.78 |
| 8 | 15 | −100.00 |
| 9 | 17 | 38.31 |

-continued

Unit: mm

| | | |
|---|---|---|
| 10 | 19 | −12.49 |
| 11 | 21 | 46.40 |
| 12 | 23 | 0.00 |
| 13 | 25 | 0.00 |

NUMERICAL EXAMPLE 5

Unit: mm

Surface Data

| Surface No. | r | d | nd | νd | Effective diameter |
|---|---|---|---|---|---|
| 1 | −94.621 | 1.80 | 1.77250 | 49.6 | 22.30 |
| 2 | 15.060 | 4.34 | | | 18.83 |
| 3* | 21.162 | 2.46 | 2.01960 | 21.5 | 19.16 |
| 4 | 33.575 | Variable | | | 18.49 |
| 5* | 19.374 | 3.63 | 1.59201 | 67.0 | 13.53 |
| 6 | −35.255 | 0.10 | | | 12.64 |
| 7 | 23.400 | 1.93 | 1.55332 | 71.7 | 11.16 |
| 8 | −58.814 | 0.80 | 1.80518 | 25.4 | 10.26 |
| 9 | 97.707 | 2.19 | | | 9.47 |
| 10 (Stop) | ∞ | 2.00 | | | 8.77 |
| 11* | −29.238 | 1.40 | 1.73077 | 40.5 | 8.24 |
| 12 | 14.838 | 0.00 | | | 8.78 |
| 13 | 14.532 | 3.03 | 1.55332 | 71.7 | 8.80 |
| 14 | −11.027 | Variable | | | 9.35 |
| 15 | −62.514 | 1.50 | 1.51633 | 64.2 | 10.39 |
| 16 | 299.115 | Variable | | | 10.95 |
| 17 | −28.651 | 2.36 | 1.80518 | 25.4 | 12.58 |
| 18* | −14.939 | 3.46 | | | 13.27 |
| 19 | −8.874 | 1.20 | 1.80400 | 46.6 | 13.24 |
| 20 | −105.647 | Variable | | | 16.60 |
| 21 | −200.000 | 3.60 | 1.88300 | 40.8 | 26.88 |
| 22 | −28.459 | 0.10 | | | 27.18 |
| 23 | ∞ | 2.36 | 1.51680 | 64.2 | 30.00 |
| 24 | ∞ | 1.10 | | | 30.00 |
| 25 | ∞ | 0.50 | 1.51680 | 64.2 | 30.00 |
| 26 | ∞ | Variable | | | 30.00 |
| Image plane | ∞ | | | | |

Aspheric Coefficients

| | | |
|---|---|---|
| R3 | K = 0.00000e+000 | A4 = 2.85163e−006 |
| | A6 = 2.51995e−008 | A8 = −1.23319e−010 |
| | A10 = 5.11219e−013 | |
| R5 | K = 0.00000e+000 | A4 = −3.51899e−005 |
| | A6 = −6.64966e−008 | A8 = −2.63782e−009 |
| | A10 = 3.67039e−011 | |
| R11 | K = 0.00000e+000 | A4 = −1.32250e−004 |
| | A6 = −3.53172e−007 | A8 = −1.27746e−008 |
| | A10 = 3.31549e−010 | |
| R18 | K = 0.00000e+000 | A4 = −2.39659e−005 |
| | A6 = −6.93775e−007 | A8 = 1.20559e−008 |
| | A10 = −1.88442e−010 | |

Various Data
Zoom Ratio 2.40

| | | | | | |
|---|---|---|---|---|---|
| Focal Length | 18.20 | 31.45 | 43.61 | 23.84 | 37.73 |
| F-number | 3.13 | 4.42 | 5.76 | 3.63 | 5.09 |
| Angle of View | 36.89 | 23.48 | 17.39 | 29.81 | 19.90 |
| Image Height | 13.66 | 13.66 | 13.66 | 13.66 | 13.66 |
| Lens Total Length | 61.45 | 59.14 | 63.82 | 58.26 | 61.05 |
| BF | 0.47 | 0.47 | 0.47 | 0.47 | 0.47 |
| d4 | 13.81 | 3.99 | 1.15 | 7.62 | 2.15 |
| d14 | 1.93 | 2.69 | 2.45 | 2.68 | 2.66 |
| d16 | 2.00 | 2.00 | 2.00 | 2.00 | 2.00 |

-continued

Unit: mm

|  | | | | | |
|---|---|---|---|---|---|
| d20 | 3.38 | 10.14 | 17.89 | 5.64 | 13.93 |
| d26 | 0.47 | 0.47 | 0.47 | 0.47 | 0.47 |
| Entrance Pupil Position | 13.61 | 10.93 | 9.93 | 12.04 | 10.29 |
| Exit Pupil Position | −25.54 | −51.39 | −129.61 | −32.66 | −77.65 |
| Front Principal Point Position | 19.07 | 23.31 | 38.92 | 18.73 | 29.80 |
| Rear Principal Point Position | −17.73 | −30.98 | −43.14 | −23.37 | −37.27 |

Various Data of Each Lens Unit

| Lens Unit | First Surface | Focal Length | Lens Config. Length | Front Principal Point Position | Rear Principal Point Position |
|---|---|---|---|---|---|
| 1 | 1 | −26.85 | 8.60 | −0.49 | −7.16 |
| 2 | 5 | 16.47 | 15.07 | 5.21 | −8.85 |
| 3 | 15 | −100.00 | 1.50 | 0.17 | −0.82 |
| 4 | 17 | −20.00 | 7.02 | 5.96 | 0.42 |
| 5 | 21 | 37.21 | 7.66 | 2.21 | −2.77 |

Single Lens Data

| Lens | First Surface | Focal Length |
|---|---|---|
| 1 | 1 | −16.70 |
| 2 | 3 | 51.03 |
| 3 | 5 | 21.65 |
| 4 | 7 | 30.51 |
| 5 | 8 | −45.49 |
| 6 | 11 | −13.29 |
| 7 | 13 | 11.83 |
| 8 | 15 | −100.00 |
| 9 | 17 | 36.00 |
| 10 | 19 | −12.12 |
| 11 | 21 | 37.21 |
| 12 | 23 | 0.00 |
| 13 | 25 | 0.00 |

TABLE 1

| | Numerical Example | | | | |
|---|---|---|---|---|---|
| Condition | 1 | 2 | 3 | 4 | 5 |
| (1) | 0.710 | 0.677 | 0.721 | 0.710 | 0.710 |
| (2) | 2.32 | 4.20 | 2.82 | 2.32 | 1.86 |
| (3) | 0.019 | 0.020 | 0.018 | 0.019 | 0.019 |
| (4) | 3.09 | 4.43 | 3.03 | 3.07 | 2.98 |
| (5) | 1.33 | 1.47 | 1.29 | 1.29 | 1.34 |
| (6) | −0.51 | −0.49 | −0.40 | −0.51 | −0.75 |
| (7) | 1.88 | 2.27 | 1.88 | 1.88 | 1.83 |
| (8) | 1.80 | 1.91 | 1.80 | 1.80 | 1.80 |

Note:
In Table 1, the following expressions correspond to the above-described conditions (1) through (8), respectively:
(1) $0.66 < |fn/\sqrt{(fw \cdot ft)}| < 0.78$
(2) $1.6 < |fp/fn| < 5.3$
(3) $|\Sigma(1/(vdni) \times (\sqrt{(fw \cdot ft)}/fni))| < 0.023$
(4) $2.0 < |fnp/fnn| < 6.0$
(5) $1.2 < f1/fn < 1.8$
(6) $-0.85 < (Rp2 - Rp1)/(Rp2 + Rp1) < -0.33$
(7) $1.5 < vnn/vnp < 4.0$
(8) $1.7 < ndn < 2.2$.

Now, an exemplary embodiment of a digital camera, as an example of an image pickup apparatus equipped with the zoom lens according to any exemplary embodiment of the present invention as a photographic optical system will be described below with reference to FIG. 11.

Referring to FIG. 11, a digital camera body 120 includes a photographic optical system 121, which is constituted by the zoom lens according to any of the above-described exemplary embodiments of the present invention. In addition, the digital camera body 120 includes an image sensor (photoelectrical conversion element or film) 122, such as a charge-coupled device (CCD) sensor or a complementary metal oxide semiconductor (CMOS) sensor, or a silver-halide film. The image sensor 122 receives an object image formed by the photographic optical system 121.

A recording unit 123 (memory device) records the object image received by the image sensor 122. The photographer can observe the object image displayed by a display device (not illustrated) via a viewfinder 124. The display device is constituted by a liquid crystal display (LCD) panel. The display device displays the object image formed on the image sensor 122.

By applying the zoom lens according to each exemplary embodiment of the present invention to an image pickup apparatus, such as a digital camera, the present invention can implement a small-size image pickup apparatus having a high optical performance.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-166579 filed Jul. 24, 2010, which is hereby incorporated by reference herein in its entirety.

What is claimed is:

1. A zoom lens comprising:
a first lens unit having a negative refractive power and which is provided at a location closest to an object side;
a lens unit LP having a positive refractive power, which is provided at a location closest to an image side, and which is stationary during zooming; and
a lens unit LN having a negative refractive power, which is provided adjacent to the lens unit LP on the object side of the lens unit LP, and which is configured to move during zooming,
wherein, when fp and fn respectively denote focal lengths of the lens unit LP and of the lens unit LN, fw and ft respectively denote focal lengths at a wide-angle end and at a telephoto end of the entire zoom lens, and fni and vdni respectively denote a focal length and Abbe number of an i-th lens among lenses that constitute the lens unit LN, the following conditions are satisfied:

$$0.66 < |fn/\sqrt{(fw \cdot ft)}| < 0.78$$

$$1.86 \leq |fp/fn| < 5.3$$

$$|\Sigma((1/(vdni)) \times (\sqrt{(fw \cdot ft)}/fni))| < 0.023,$$

where i is a positive integer equal to or greater than 1 counted from the object side towards the image side.

2. The zoom lens according to claim 1, wherein, the lens unit LN comprises at least one positive lens and at least one negative lens and when fnp is a focal length of a lens having a highest positive refractive power among lenses constituting the lens unit LN, and fnn is a focal length of a lens having a highest negative refractive power among the lenses constituting the lens unit LN, the following condition is satisfied:

$$2.0 < |fnp/fnn| < 6.0.$$

3. The zoom lens according to claim 1, wherein, when f1 is a focal length of the first lens unit, the following condition is satisfied:

$$1.2 < f1/fn < 1.8.$$

4. The zoom lens according to claim 1, wherein, when Rp1 and Rp2 are radii of curvature of lens surfaces on the object side and the image side, respectively, of a lens having a highest positive refractive power among lenses constituting the lens unit LP, the following condition is satisfied:

$$-0.85 < (Rp2-Rp1)/(Rp2+Rp1) < -0.33.$$

5. The zoom lens according to claim 1, wherein, the lens unit LN comprises at least one positive lens and at least one negative lens and when vnp is an Abbe number of a material of a lens having a highest positive refractive power among lenses constituting the lens unit LN, and vnn is an Abbe number of a material of a lens having a highest negative refractive power among the lenses constituting the lens unit LN, the following condition is satisfied:

$$1.5 < vnn/vnp < 4.0.$$

6. The zoom lens according to claim 1, wherein, when ndn is an average value of refractive indices of materials of lenses constituting the lens unit LN with respect to d-line light, the following condition is satisfied:

$$1.7 < ndn < 2.2.$$

7. The zoom lens according to claim 1, wherein the zoom lens comprises, in order from the object side to the image side:
the first lens unit having a negative refractive power;
a second lens unit having a positive refractive power; and
a rear lens group including two or more lens units which include the lens unit LN and the lens unit LP,
wherein the first lens unit and the second lens unit move during zooming.

8. The zoom lens according to claim 7, wherein the rear lens group consists of, in order from the object side to the image side:
a third lens unit being the lens unit LN having a negative refractive power; and
a fourth lens unit being the lens unit LP having a positive refractive power.

9. The zoom lens according to claim 7, wherein the rear lens group consists of, in order from the object side to the image side:
a third lens unit having a positive refractive power;
a fourth lens unit being the lens unit LN having a negative refractive power; and
a fifth lens unit being the lens unit LP having a positive refractive power.

10. The zoom lens according to claim 7, wherein the rear lens group consists of, in order from the object side to the image side:
a third lens unit having a negative refractive power;
a fourth lens unit being the lens unit LN having a negative refractive power; and
a fifth lens unit being the lens unit LP having a positive refractive power.

11. An image pickup apparatus comprising:
a zoom lens; and
a photoelectric conversion element configured to receive an image formed by the zoom lens,
the zoom lens comprising:
a first lens unit having a negative refractive power and which is provided at a location closest to an object side;
a lens unit LP having a positive refractive power, which is provided at a location closest to an image side, and which is stationary during zooming; and
a lens unit LN having a negative refractive power, which is provided adjacent to the lens unit LP on the object side of the lens unit LP, and which is configured to move during zooming,
wherein, when fp and fn respectively denote focal lengths of the lens unit LP and of the lens unit LN, fw and ft respectively denote focal lengths at a wide-angle end and at a telephoto end of the entire zoom lens, and fni and vdni respectively denote a focal length and Abbe number of an i-th lens among lenses that constitute the lens unit LN, the following conditions are satisfied;

$$0.66 < |fn/\sqrt{(fw \cdot ft)}| < 0.78$$

$$1.86 \leq |fp/fn| < 5.3$$

$$|\Sigma((1/(vdni)) \times (\sqrt{(fw \cdot ft)}/fni))| < 0.023,$$

where i is a positive integer equal to or greater than 1 counted from the object side towards the image side.

* * * * *